United States Patent
Haruta et al.

(10) Patent No.: US 10,494,546 B2
(45) Date of Patent: Dec. 3, 2019

(54) COATING MATERIAL AND METHOD OF PRODUCING THE SAME

(71) Applicant: NITTO DENKO CORPORATION, Ibaraki-shi, Osaka (JP)

(72) Inventors: Hiromoto Haruta, Ibaraki (JP); Hiroyuki Takemoto, Ibaraki (JP); Daisuke Hattori, Ibaraki (JP); Kozo Nakamura, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/539,927

(22) PCT Filed: Dec. 25, 2015

(86) PCT No.: PCT/JP2015/086365
§ 371 (c)(1),
(2) Date: Jun. 26, 2017

(87) PCT Pub. No.: WO2016/104765
PCT Pub. Date: Jun. 30, 2016

(65) Prior Publication Data
US 2017/0349784 A1      Dec. 7, 2017

(30) Foreign Application Priority Data

Dec. 26, 2014 (JP) ................... 2014-266787
Jul. 31, 2015 (JP) ................... 2015-152969
Sep. 7, 2015 (JP) ................... 2015-176207

(51) Int. Cl.
| | | |
|---|---|---|
| C09D 183/04 | (2006.01) | |
| C08G 77/16 | (2006.01) | |
| C08G 77/38 | (2006.01) | |
| C08J 3/075 | (2006.01) | |
| B02C 19/18 | (2006.01) | |
| B32B 5/16 | (2006.01) | |

(52) U.S. Cl.
CPC ........... *C09D 183/04* (2013.01); *C08G 77/16* (2013.01); *C08G 77/38* (2013.01); *B02C 19/18* (2013.01); *B32B 5/16* (2013.01); *C08J 3/075* (2013.01)

(58) Field of Classification Search
CPC .... C08L 83/04; C08L 83/06; C08J 3/02–3/11; B32B 5/16; C09D 183/04; C09D 183/06
See application file for complete search history.

(56) References Cited

U.S. PATENT DOCUMENTS

| | | | |
|---|---|---|---|
| 2,870,109 A | 1/1959 | Nickerson | |
| 4,408,009 A | 10/1983 | Mallon | |
| 5,124,188 A | 6/1992 | Roe et al. | |
| 5,676,938 A * | 10/1997 | Kimura | A61K 8/585 424/70.12 |
| 5,844,060 A * | 12/1998 | Furuya | C08G 77/06 528/30 |
| 5,948,314 A | 9/1999 | Geiss et al. | |
| 5,948,482 A * | 9/1999 | Brinker | C01B 13/145 106/287.12 |
| 6,265,516 B1 | 7/2001 | Okawa et al. | |
| 6,300,385 B1 | 10/2001 | Hashida et al. | |
| 7,960,029 B2 | 6/2011 | Kai et al. | |
| 8,124,224 B2 | 2/2012 | Kato et al. | |
| 2001/0003358 A1 | 6/2001 | Terase et al. | |
| 2003/0134124 A1 | 7/2003 | Ochiai | |
| 2004/0114248 A1 | 6/2004 | Hokazono et al. | |
| 2004/0132846 A1 | 7/2004 | Leventis et al. | |
| 2004/0216641 A1 | 11/2004 | Hamada et al. | |
| 2005/0038137 A1 | 2/2005 | Yoshihara et al. | |
| 2005/0162743 A1 | 7/2005 | Yano et al. | |
| 2006/0239886 A1 | 10/2006 | Nakayama et al. | |

(Continued)

FOREIGN PATENT DOCUMENTS

| | | |
|---|---|---|
| CN | 1275589 A | 12/2000 |
| CN | 1646947 A | 7/2005 |

(Continued)

OTHER PUBLICATIONS

Website entry from Horiba Scientific at the url http://www.horiba.com/scientific/products/particle-characterization/education/general-information/data-interpretation/number-vs-volume-distributions/ (no date).*

Office Action dated Apr. 19, 2018, issued in U.S. Appl. No. 15/539,926. (10 pages).

International Search Report dated Mar. 29, 2016, issued in counterpart of International Application No. PCT/JP2015/086365 (2 pages).

Yildirim et al., "Template free preparation of nanoporous organically modified silica thin films on flexible substrates," Journal of Materials Chemistry, 2011, 21, pp. 14830-14837, cited in the specifications of PCT/JP2015/086365 and PCT/JP2015/086364.

(Continued)

*Primary Examiner* — Marc S Zimmer
(74) *Attorney, Agent, or Firm* — Westerman, Hattori, Daniels & Adrian, LLP

(57) ABSTRACT

The present invention provides a coating material that allows a structure with void spaces having a strength and flexibility to be formed. The coating material of the present invention includes: pulverized products of a gelled silicon compound obtained from a silicon compound containing at least three or less functional groups having saturated bonds; and a dispersion medium, wherein the pulverized product contains a residual silanol group. The method of producing a coating material according to the present invention includes steps of: causing gelation of a silicon compound containing at least three or less functional groups having saturated bonds and mixing the gelled silicon compound and a dispersion medium. According to the coating material of the present invention, for example, a coating film is formed by coating a base with the coating material and a porous structure is formed by chemically bonding the pulverized products contained in the coating film.

16 Claims, 7 Drawing Sheets

(56) References Cited

U.S. PATENT DOCUMENTS

| | | | |
|---|---|---|---|
| 2006/0269733 A1 | 11/2006 | Mizuno et al. | |
| 2006/0281828 A1 | 12/2006 | Nakayama et al. | |
| 2007/0206283 A1 | 9/2007 | Ohtani et al. | |
| 2008/0171188 A1 | 7/2008 | Van Baak et al. | |
| 2008/0290472 A1 | 11/2008 | Yagihashi et al. | |
| 2009/0244709 A1 | 10/2009 | Suzuki et al. | |
| 2010/0102251 A1 | 4/2010 | Ferrini et al. | |
| 2010/0256321 A1* | 10/2010 | Kim | C08G 77/06 528/14 |
| 2011/0033398 A1* | 2/2011 | Cauvin | A61K 8/06 424/59 |
| 2011/0224308 A1* | 9/2011 | Saito | A61K 8/0279 514/772 |
| 2014/0371317 A1* | 12/2014 | Aliyar | C08L 71/02 514/567 |
| 2015/0166353 A1 | 6/2015 | Kobayashi | |
| 2016/0194451 A1 | 7/2016 | Yoshida et al. | |

FOREIGN PATENT DOCUMENTS

| | | |
|---|---|---|
| CN | 102460244 A | 5/2012 |
| CN | 102736135 A | 10/2012 |
| CN | 103213996 A | 7/2013 |
| CN | 103660513 A | 3/2014 |
| EP | 1031612 A2 | 2/1999 |
| EP | 3 235 638 A1 | 10/2017 |
| EP | 3239221 A1 | 11/2017 |
| EP | 3246355 A1 | 11/2017 |
| EP | 8239257 A1 | 11/2017 |
| JP | 61-250032 A | 11/1986 |
| JP | 5-506681 A | 9/1993 |
| JP | 9-24575 A | 1/1997 |
| JP | H10-508049 A | 8/1998 |
| JP | 2000-119433 A | 4/2000 |
| JP | 2000-264620 A | 9/2000 |
| JP | 2000-284102 A | 10/2000 |
| JP | 2001-163613 A | 6/2001 |
| JP | 2002-311204 A | 10/2002 |
| JP | 2004-10424 A | 1/2004 |
| JP | 2004-323752 A | 11/2004 |
| JP | 2004-354699 A | 12/2004 |
| JP | 2005-154195 A | 6/2005 |
| JP | 2005-350519 A | 12/2005 |
| JP | 2006-11175 A | 1/2006 |
| JP | 2006-96019 A | 4/2006 |
| JP | 2006-96967 A | 4/2006 |
| JP | 2006-221144 A | 8/2006 |
| JP | 2006-255496 A | 9/2006 |
| JP | 2006-297329 A | 11/2006 |
| JP | 2007-014946 A | 1/2007 |
| JP | 2008-40171 A | 2/2008 |
| JP | 2008-205008 A | 9/2008 |
| JP | 2009-503226 A | 1/2009 |
| JP | 2009-258711 A | 11/2009 |
| JP | 2012-91943 A | 5/2012 |
| JP | 2012-228878 A | 11/2012 |
| JP | 2013-60309 A | 4/2013 |
| JP | 2014-46518 A | 3/2014 |
| JP | 2014-122309 A | 7/2014 |
| JP | 2015-028540 A | 2/2015 |
| JP | 2016-104551 A | 6/2016 |
| TW | 213860 B | 10/1993 |
| TW | 200844194 A | 11/2008 |
| TW | 201447389 A | 12/2014 |
| TW | 201447402 A | 12/2014 |
| WO | 2010/120845 A2 | 10/2010 |
| WO | 2010/120971 A1 | 10/2010 |
| WO | 2014/034588 A1 | 3/2014 |

OTHER PUBLICATIONS

Adachi et al., "Preparation of the Silica Gel Monolith by the Sol-Gel Method Using N, N-Dimethylformamide and the Vitrification of the Gel," Yogyo-Kyokai-Shi 95 [10] 1987, pp. 970-975, with English abstract (similar to the disclosure of T. Adachi et al., J. Mater. Sci., 22. 4407-4410, 1987, cited in the specifications of PCT/JP2015/086362 and PCT/JP2015/086363).
International Search Report dated Mar. 8, 2016, issued in International Application No. PCT/JP2015/086362 (2 pages).
International Search Report dated Mar. 8, 2016, issued in International Application No. PCT/JP2015/086363 (2 pages).
International Search Report dated Apr. 12, 2016, issued in International Application No. PCT/JP2015/086364 (1 page).
International Search Report dated Nov. 8, 2016, issued in International Application no. PCT/JP2016/072417 (counterpart of U.S. Appl. No. 15/749,250). (2 pages).
International Search Report dated Nov. 8, 2016, issued in International Application No. PCT/JP2016/072418 (counterpart of U.S. Appl. No. 15/749,148). (3 pages).
International Search Report dated Nov. 8, 2016, issued in International Application No. PCT/JP2016/072452 (counterpart of U.S. Appl. No. 15/754,406). (2 pages).
International Preliminary Report on Patentability (Form PCT/IB/373) dated Jun. 27, 2017 of International Application No. PCT/JP2015/086365(counterpart of U.S. Appl. No. 15/539,927), with Form PCT/ISA/237. (8 pages).
International Preliminary Report on Patentability (Form PCT/IB/373) dated Jun. 27, 2017 of International Application No. PCT/JP2015/086364(counterpart of U.S. Appl. No. 15/539,928), with Form PCT/ISA/237. (11 pages).
International Preliminary Report on Patentability (Form PCT/IB/373) dated Jun. 27, 2017 of International Application No. PCT/JP2015/086363(counterpart of U.S. Appl. No. 15/539,946), with Form PCT/ISA/237. (10 pages).
International Preliminary Report on Patentability (Form PCT/IB/373) dated Jun. 27, 2017 of International Application No. PCT/JP2015/086362(counterpart of U.S. Appl. No. 15/539,926), with Form PCT/ISA/237. (8pages).
International Preliminary Report on Patentability (Form PCT/IB/373) dated Feb. 6, 2018 of International Application No. PCT/JP2016/072418(counterpart of U.S. Appl. No. 15/749,148), with Form PCT/ISA/237. (19 pages).
International Preliminary Report on Patentability (Form PCT/IB/373) dated Feb. 6, 2018 of International Application No. PCT/JP2016/072417(counterpart of U.S. Appl. No. 15/749,250), with Form PCT/ISA/237. (22 pages).
International Preliminary Report on Patentability (Form PCT/IB/373) dated Feb. 27, 2018 of International Application No. PCT/JP2016/072452(counterpart of U.S. Appl. No. 15/754,406), with Form PCT/ISA/237. (8 pages).
Non-Final Office Action dated Jun. 18, 2018, issued in U.S. Appl. No. 15/539,926.
"What is Aerogel?" (Year:2008), cited in Non-Final Office Action dated Jun. 18, 2018, https://web.archive.org/web/20080621095754/http://www.aerogel.org/?p=3.
Extended European Search Report dated Jun. 14, 2018, issued in corresponding European Patent Application No. 15873333.7.
Markus Börner et al., "Cross-Linked Monolithic Xerogels Based on Silica Nanoparticles", Chemistry of Materials, 2013, pp. 3648-3653.
Baris R. Mutiu et al., Silicon alkoxide cross-linked silica nanoparticles gels for encapsulation of bacterial biocatalysts, Journal of Materials Chemistry A., 2013.
Extended European Search Report dated Jun. 27, 2018, issued in Application No. 15873330.3 (corresponds to U.S. Appl. No. 15/539,926).
Extended European Search Report dated Aug. 13, 2018, issued in Application No. 15873332.3 (corresponds to U.S. Appl. No. 15/539,928).
Office Action dated Oct. 31, 2018, issued in Chinese application No. 201580071024.9, with English translation corresponds to U.S. Appl. No. 15/539,928. (11 pages).
Extended (Supplementary) European Search Report dated Sep. 24, 2018, issued in counterpart application No. 15873331.1. (9 pages).
Extended (Supplementary) European Search Report dated Feb. 14, 2019, issued in EP application No. 16832969.6 (counterpart to U.S. Appl. No. 15/749,250)(6 pages).

(56) References Cited

OTHER PUBLICATIONS

Office Action dated Feb. 7, 2019, issued in counterpart EP application No. 15873333.7. (4 pages).
Extended (Supplementary) European Search Report dated Mar. 6, 2019, issued in EP application No. 16832970.4 (counterpart to U.S. Appl. No. 15/749,148)(9 pages).
Requirement for Restriction Election dated Feb. 27, 2019, issued in U.S. Appl. No. 15/539,928 (7 pages).
Extended (Supplementary) European Search Report dated Mar. 7, 2019, issued in EP application No. 16839019.3 (counterpart to U.S. Appl. No. 15/754,406)(6 pages).
Requirement for Restriction Election dated Feb. 8, 2019, issued in U.S. Appl. No. 15/539,946 (5 pages).
Notice of Allowance dated Mar. 20, 2019, issued in U.S. Appl. No. 15/539,926 (28 pages).
Office Action dated Feb. 27, 2019, issued in counterpart CN application No. 201580071004.1, with partial English translation. (12 pages).
Office Action dated Jun. 11, 2019, issued in JP application No. 2015-176205 (counterpart to U.S. Appl. No. 15/539,946), with partial English translation. (5 pages).
Office Action dated Jun. 13, 2019, issued in JP application No. 2015-176204 (counterpart to U.S. Appl. No. 15/539,926), with partial English translation. (5 pages).
Non-Final Office Action dated Jul. 10, 2019, issued in U.S. Appl. No. 15/539,928 (36 pages).
Office Action dated Jun. 28, 2019, issued in CN application No. 201580071024.9 (counterpart to U.S. Appl. No. 15/539,928), with partial machine translation. (12 pages).
Office Action dated Jul. 1, 2019, issued in CN application No. 201680043414.X (counterpart to U.S. Appl. No. 15/754,406), with partial machine translation. (15 pages).
Office Action dated Jun. 26, 2019, issued in TW application No. 104143838 (counterpart to U.S. Appl. No. 15/539,946), with partial English translation. (15 pages).
Office Action dated Aug. 6, 2019, issued in JP application No. 2019-133188 (counterpart to U.S. Appl. No. 15/539,946), with partial English translation. (7 pages).
Office Action dated Jul. 2, 2019, issued in TW application No. 104143841 (counterpart to U.S. Appl. No. 15/539,926), with partial English translation. (11 pages).
Search Report dated May 31, 2019, issued in CN application No. 2016800376799 (counterpart to U.S. Appl. No. 15/749,148). (1 pages).
Office Action dated May 31, 2019, issued in CN application No. 201680037679.9 (counterpart to U.S. Appl. No. 15/749,148), with partial English translation. (10 pages).
Office Action dated Aug. 26, 2019, issued in counterpart EP application No. 15873333.7. (3 pages).
Office Action dated Jul. 22, 2019, issued in TW application No. 104143840 (counterpart to U.S. Appl. No. 15/539,928), with English translation. (13 pages).
Office Action dated Aug. 21, 2019, issued in counterpart TW application No. 104143837, with partial English translation. (10 pages).

\* cited by examiner

COATING MATERIAL AND METHOD OF PRODUCING THE SAME

TECHNICAL FIELD

The present invention relates to a coating material and a method of producing the same.

BACKGROUND ART

Various studies have been conducted as to a sol liquid for silanol porous body that can form a structure with void spaces (hereinafter, also referred to as a "void-provided structure") using a silica compound material (silicon compound material) as a raw material. In such studies, the following point is in common. That is, after gelation of a silica compound, a sol liquid in which the gelled silica compound is pulverized is prepared, and a base is coated with the sol liquid to form a void-provided structure. However, there is a problem that an attempt of achieving a higher porosity decreases the film strength of the silanol porous body significantly, which makes it difficult to industrially obtain a silanol porous body in a simple manner. Regarding an example of a member, which achieves a high porosity and a high strength, there are methods of applying the member to an antireflection layer of a lens (for example, see Patent Documents 1 to 4). In each of these methods, a layer with void spaces (hereinafter, also referred to as a "void-provided layer") is formed on a lens and then baked at a high temperature of 150° C. or more for a long time. These methods, however, have the following problem. Since the gel obtained by using tetraethoxysilane (TEOS) as a raw material is inferior in flexibility, the porous body cannot be formed on a soft base. On the other hand, there is an example of application of a void-provided layer, without carrying out baking treatment (for example, see Non-Patent Document 1). This method, however, has the following problem. Since a number of residual silanol groups remain in the silanol pulverized sol and the formed void-provided layer is not subjected to the baking treatment, the porous body to be obtained is inferior in film strength and does not achieve an impact resistance.

For solving such problems, there are attempts to develop a film that can be a substitute for an air layer which is a void space between components.

CITATION LIST

Patent Document (s)

Patent Document 1: JP 2006-297329 A
Patent Document 2: JP 2006-221144A
Patent Document 3: JP 2006-011175 A
Patent Document 4: JP 2008-040171 A

Non-Patent Document(s)

Non-Patent Document 1: J. Mater. Chem., 2011, 21, 14830-14837

BRIEF SUMMARY OF THE INVENTION

Problem to be Solved by the Invention

There has not been reported a sol coating material for forming a void-provided layer, which achieves a film strength and flexibility, in a simple and easy manner. Hence, for example, the present invention is intended to provide a silanol sol coating material that allows a void-provided layer having a high porosity (proportion of void space), a high film strength, and high flexibility to be formed in the form of a film continuously in a simple and easy manner.

Means for Solving Problem

In order to achieve the above object, the present invention provides a silicone sol coating material including: pulverized products of a gelled silicon compound obtained from a silicon compound containing at least three or less functional groups having saturated bonds; and a dispersion medium, wherein the pulverized product contains a residual silanol group at 1 mol % or more, and the pulverized products are to be chemically bonded.

The present invention also provides a method of producing the silicone sol coating material according to the present invention, including a step of: mixing a dispersion medium and pulverized products of a gelled silicon compound obtained from a silicon compound containing at least three or less functional groups having saturated bonds.

The present invention also provides a first coating raw material for use in production of the silicone sol coating material according to the present invention, including: a gelled silicon compound obtained from a silicon compound containing at least three or less functional groups having saturated bonds.

The present invention also provides a method of producing the first coating raw material according to the present invention, including a step of causing gelation of a silicon compound containing at least three or less functional groups having saturated bonds in a solvent to generate a gelled silicon compound.

The present invention also provides a second coating raw material for use in production of the silicone sol coating material according to the present invention, including: a gelled silicon compound, which is a gelled product obtained from a silicon compound containing at least three or less functional groups having saturated bonds, that has been subjected to aging treatment.

The present invention also provides a method of producing the second coating raw material according to the present invention, including a step of: aging a gelled silicon compound obtained from a silicon compound containing at least three or less functional groups having saturated bonds in a solvent.

Effects of the Invention

The silicone sol coating material of the present invention includes the pulverized products of the gelled silicon compound and allows the pulverized products to be chemically bonded. Thus, for example, by chemically bonding the pulverized products in a coating film formed by using the coating material, a silicone porous body with void spaces can be produced.

The inventors of the present invention conducted earnest studies and found that pulverized products of a gelled silanol compound can be chemically bonded by making a silanol group remain in the pulverized product. Then, the inventors found that the silicone sol coating material of the present invention allows a silicone porous body to be formed as a void-provided layer, which achieves a film strength and flexibility, in a simple and easy manner by forming a coating film and chemically bonding the pulverized products in the coating film, for example. According to the silicone sol coating material of the present invention, for example, the silanol porous body can be applied to various objects. Specifically, the silicone porous body obtained by using the silicone sol coating material of the present invention can be applied, as a substitute for an air layer, to a heat insulating material, a sound absorbing material, a regenerative medical scaffolding, a dew condensation preventing material, an optical element, and the like, for example. Accordingly, the silicone sol coating material and the method of producing the same according to the present invention are useful in production of the silicone porous body having the above described properties, for example.

DETAILED DESCRIPTION OF THE INVENTION

Figure 1:
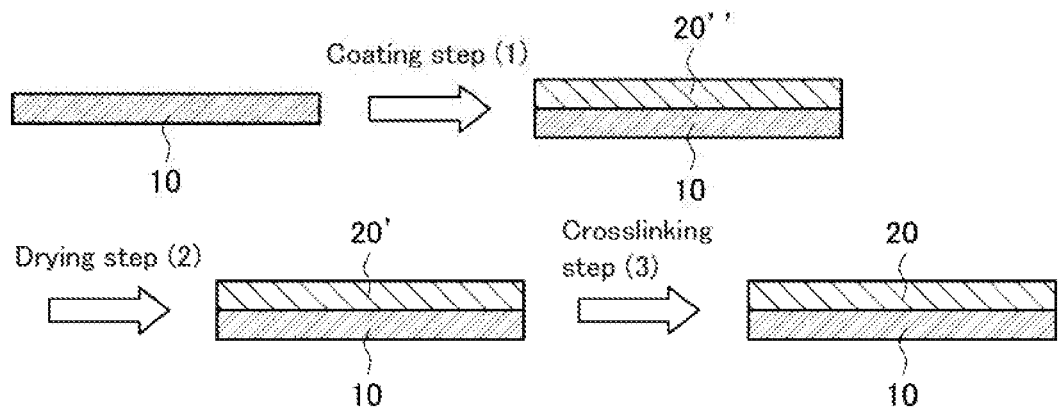
FIG. 1 is a process cross sectional view schematically showing an example of the method of forming a silicone porous body 20 on a base 10 by using a coating material of the present invention.

In the coating material of the present invention, for example, the volume average particle size of the pulverized product is in the range from 0.05 to 2.00 μm. In the present invention, the shape of the "particle" (for example, the particle of the pulverized product) is not limited to particular shapes, and can be, for example, a spherical shape, a non-spherical shape, and the like. Furthermore, in the present invention, the particle of the pulverized product may be, for example, a sol-gel beaded particle, a nanoparticle (hollow nanosilica/nanoballoon particle), nanofiber, and the like.

In the coating material of the present invention, for example, the silicon compound is a compound represented by the chemical formula (2) described below.

The coating material of the present invention contains, for example, a catalyst for chemically bonding the pulverized products.

The method of producing a coating material according to the present invention further includes a step of: pulverizing the gelled silicon compound in a solvent, wherein pulverized products obtained in the pulverizing step are used in the mixing step, for example.

The method of producing a coating material according to the present invention further includes a step of: causing gelation of the silicon compound in a solvent to generate the gelled silicon compound, wherein the gelled silicon compound obtained in the gelation step is used in the pulverizing step, for example.

The method of producing a coating material according to the present invention further includes a step of: aging the gelled silicon compound in a solvent, wherein the gelled silicon compound after the aging step is used in the gelation step, for example.

In the aging step of the method of producing a coating material according to the present invention, the gelled silicon compound is incubated at 30° C. or more in the solvent, for example.

The present invention is described below in more detail with reference to illustrative examples. The present invention, however, is not limited or restricted by the following description.

[1. Coating Material and Production Method of the Same]

The silicone sol coating material of the present invention includes: pulverized products of a gelled silicon compound obtained from a silicon compound containing at least three or less functional groups having saturated bonds; and a solvent, wherein the pulverized product contains a residual silanol group and the pulverized products are to be chemically bonded. The phrase "contains three or less functional groups having saturated bonds" means that the silicon compound includes three or less functional groups and these functional groups establish saturated bonds with silicon (Si).

The method of producing a coating material of the present invention is, as described above, the method of producing a silicone sol coating material of the present invention including a step of: mixing a dispersion medium and pulverized products of a gelled silicon compound obtained from a silicon compound containing at least three or less functional groups having saturated bonds as described above.

The coating material of the present invention can be used in production of a silicone porous body having a function (for example, low refractive index) equivalent to that of an air layer as described below. Specifically, the coating material obtained by the production method of the present invention includes the pulverized products of the gelled silicon compound. Owing to pulverization of the gelled silicon compound, the three-dimensional structure of the gelled compound is destroyed, and the pulverized products can form a new three-dimensional structure, which is different from that of the unpulverized gelled silicon compound. Thus, for example, the coating film (the precursor of the silicone porous body) formed by using the coating material is a layer having a new pore structure (new void-provided structure), which cannot be obtained from the layer formed by using the unpulverized gelled silicon compound. This allows the layer to have a function (for example, low refractive index) equivalent to that of an air layer. Furthermore, since the pulverized products of the coating material of the present invention contain residual silanol groups, the pulverized products can be chemically bonded after a new three-dimensional structure is formed as the coating film (the precursor of the silicone porous body). Thereby, the obtained silicone porous body, despite its structure with void spaces, can maintain a sufficient strength and sufficient flexibility. Thus, according to the present invention, the silicone porous body can be applied to various objects in a simple and easy manner. The coating material obtained by the production method of the present invention is very useful in production of the porous structure that can be a substitute for an air layer, for example. The air layer is formed between the components by stacking components with a space by providing a spacer or the like therebetween. On the other hand, the silicone porous body obtained by using the coating material of the present invention can achieve a function equivalent to that of the air layer only by disposing it at a desired site. Thus, as described above, the function equivalent to that of the air layer can be applied to various objects in a simpler and easier manner than forming the air layer. Specifically, the porous structure can be applied, as a substitute for an air layer, to a heat insulating material, a sound absorbing material, a regenerative medical scaffolding, a dew condensation preventing material, and the like, for example.

The coating material of the present invention can also be referred to as a coating material for forming a silicone porous body or a coating material for forming a low refractive index layer, for example. In the coating material of the present invention, the gelled silicon compound denotes the pulverized products thereof.

In the coating material of the present invention, the volume average particle size of the pulverized product is not limited to particular values, and the lower limit thereof is, for example, 0.05 µm or more, 0.10 µm or more, 0.20 µm or more, or 0.40 µm or more, the upper limit thereof is, for example, 2.00 µm or less, 1.50 µm or less, or 1.00 µm or less, and the volume average particle size is, for example, in the range from 0.05 µm to 2.00 µm, 0.20 µm to 1.50 µm, or 0.40 µm to 1.00 µm. The volume average particle size shows the particle size variations of the pulverized product in the coating material of the present invention. The particle size distribution can be measured, for example, using a particle size distribution analyzer based on dynamic light scattering, laser diffraction, or the like or using an electron microscope such as a scanning electron microscope (SEM) or a transmission electron microscope (TEM).

In the coating material of the present invention, the particle size distribution of the pulverized product is not limited to particular values. The distribution of the particle having a particle size of 0.4 µm to 1 µm is in the range from 50 wt % to 99.9 wt %, 80 wt % to 99.8 wt %, or 90 wt % to 99.7 wt % or the distribution of the particle having a particle size of 1 µm to 2 µm is in the range from 0.1 wt % to 50 wt %, 0.2 wt % to 20 wt %, or 0.3 wt % to 10 wt %, for example. The particle size distribution shows the particle size variations of the pulverized product in the coating material of the present invention. The particle size distribution can be measured, for example, using a particle size distribution analyzer or an electron microscope.

In the coating material of the present invention, the silicon compound is, for example, a compound represented by the chemical formula (2) below.

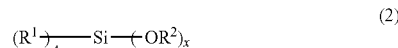

In the chemical formula (2), for example, X is 2, 3, or 4, $R^1$ and $R^2$ each represent a linear or branched alkyl group, $R^1$ and $R^2$ may be the same or different, $R^1$ may be the same or different in the case where X is 2, and $R^2$ may be the same or different.

X and $R^1$ are the same as those in the chemical formula (1), for example. Regarding $R^2$, for example, reference can be made to the examples of $R^1$ in the chemical formula (1).

A specific example of the silicon compound represented by the chemical formula (2) can be a compound represented by the chemical formula (2') wherein X is 3. In the chemical formula (2'), $R^1$ and $R^2$ are the same as those in the chemical formula (2). When $R^1$ and $R^2$ both represent methyl groups, the silicon compound is trimethoxy(methyl)silane (hereinafter, also referred to as "MTMS").

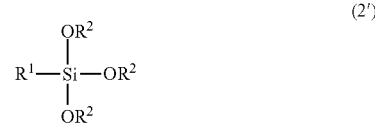

In the coating material of the present invention, the concentration of the pulverized product of the gelled silicon compound in the dispersion medium is not limited to particular values, and is, for example, in the range from 0.3% to 50% (v/v), 0.5% to 30% (v/v), or 1.0% to 10% (v/v). When the concentration of the pulverized product is too high, there is a possibility that the fluidity of the sol liquid decreases significantly, which causes aggregates and coating stripes in coating, for example. On the other hand, when the concentration of the pulverized product is too low, there is a possibility not only that the drying of the sol solvent takes a relatively long time but also that the residual solvent right after the drying increases, which may decrease the porosity, for example. The silicon atoms contained in the coating material of the present invention are preferably bonded by a siloxane bond, for example. As a specific example, the proportion of the unbonded silicon atoms (i.e., residual silanol) among all the silicon atoms contained in the coating material is, for example, less than 50%, 30% or less, or 15% or less.

There is no particular limitation on the physical property of the coating material. The shear viscosity of the coating material is, for example, 100 cPa·s or less, 10 cPa·s or less, or 1 cPa·s or less, for example, at the shear rate of 1000 1/s. When the shear viscosity is too high, for example, there is a possibility that the coating stripes are generated, which causes defectiveness such as decrease in the transfer rate in the gravure coating. In contrast, when the shear viscosity is too low, for example, there is a possibility that the thickness of the wet coating during coating cannot be increased and a desired thickness cannot be obtained after drying.

In the coating material of the present invention, the dispersion medium (hereinafter, also referred to as a "coating solvent") is not limited to particular solvents, and can be, for example, the solvent for gelation (hereinafter, also referred to as a "gelation solvent") and the solvent for pulverization (hereinafter, also referred to as a "pulverization solvent") described below, and the pulverization solvent is preferable. The coating solvent can be, for example, an organic solvent having a boiling point at 130° C. or less. Specific examples of the solvent include IPA, ethanol, methanol, and butanol.

The coating material of the present invention may contain a catalyst for chemically bonding the pulverized products of the gelled silicon compound, for example. The content of the catalyst is not limited to particular values, and the content of the catalyst relative to the weight of the pulverized product of the gelled silicon compound is, for example, 0.01 wt % to 20 wt %, 0.05 wt % to 10 wt %, or 0.1 wt % to 5 wt %.

The coating material of the present invention may further contain a crosslinking assisting agent for indirectly bonding the pulverized products of the gelled silicon compound, for example. The content of the crosslinking assisting agent is not limited to particular values, and the content of the crosslinking assisting agent relative to the weight of the pulverized product of the gelled silicon compound is, for example, 0.01 wt % to 20 wt %, 0.05 wt % to 15 wt %, or 0.1 wt % to 10 wt %.

The coating material of the present invention is also referred to as a "sol particle liquid" since the coating material is obtained by dispersing the sol pulverized products into the solvent, for example. After coating the base with the coating material of the present invention and drying it, by chemically crosslinking the particles in the bonding step, the continuous formation of a void-provided layer having a film strength of a certain level or more can be performed. The "sol" in the present invention denotes a fluidic state in which the pulverized products (i.e., silica sol particles each having a nano three-dimensional structure holding a part of the void-provided structure) are dispersed in a solvent by pulverization of the three-dimensional structure of a gel.

The production method of the present invention is described below. As to the coating material of the present invention, reference can be made to the description described below.

In the production method of the present invention, the mixing step is, as described above, a step of mixing the dispersion medium and the pulverized products of the gelled silicon compound obtained from a silicon compound containing at least three or less functional groups having saturated bonds. In the present invention, for example, the pulverized products of the gelled silicon compound can be obtained from the gelled silicon compound in the pulverizing step described below. This gelled silicon compound can be referred to as a first coating raw material of the coating material of the present invention, for example. The pulverized products of the gelled silicon compound can be obtained also from the gelled silicon compound, after the gelled silicon compound has been subjected to aging treatment described below in the aging step, in the pulverizing step described below, for example. This gelled silicon compound after the aging treatment can be referred to as a second coating raw material of the coating material of the present invention, for example.

In the production method of the present invention, the gelation step is a step of causing gelation of the silicon compound containing at least three or less functional groups having saturated bonds in a solvent to generate a gelled silicon compound (first coating raw material). The gelation step is, for example, a step of causing gelation of the monomer silicon compound in the presence of a dehydration condensation catalyst by a dehydration condensation reaction. In the gelation step, a gelled silicon compound is obtained. The gelled silicon compound includes a residual silanol group as described above, and the amount of the residual silanol group is preferably adjusted appropriately according to the chemical bond among the pulverized products of the gelled silicon compound.

In the gelation step, the silicon compound is not limited to particular silicon compounds as long as gelation is caused by a dehydration condensation reaction. By the dehydration condensation, for example, the silicon compounds are bonded. The bond among the silicon compounds is, for example, a hydrogen bond or an intermolecular bond.

The silicon compound can be, for example, a silicon compound represented by the following chemical formula (1). Since the silicon compound represented by the chemical formula (1) includes a hydroxyl group, the silicon compounds represented by the chemical formula (1) can be bonded by a hydrogen bond or an intermolecular bond through their hydroxyl groups, for example.

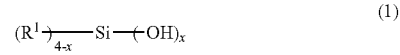

In the chemical formula (1), for example, X is 2, 3, or 4, and $R^1$ represents a linear or a branched alkyl group. The carbon number of $R^1$ is, for example, 1 to 6, 1 to 4, or 1 to 2. Examples of the linear alkyl group include a methyl group, an ethyl group, a propyl group, a butyl group, a pentyl group, and a hexyl group, and examples of the branched alkyl group include an isopropyl group and an isobutyl group. The X is, for example, 3 or 4.

A specific example of the silicon compound represented by the chemical formula (1) can be a compound represented by the chemical formula (1'), wherein X is 3. In the chemical formula (1'), $R^1$ is the same as that in the chemical formula (1), and is, for example, a methyl group. When $R^1$ represents a methyl group, the silicon compound is tris(hydroxy) methylsilane. When X is 3, the silicon compound is, for example, trifunctional silane having three functional groups.

A specific example of the silicon compound represented by the chemical formula (1) can be a compound represented by the chemical formula (1') wherein X is 4. In this case, the silicon compound is, for example, tetrafunctional silane having four functional groups.

The silicon compound may be, for example, a precursor that forms a silicon compound represented by the chemical formula (1) by hydrolysis. The precursor is not limited as long as it can generate the silicon compound by hydrolysis, for example. A specific example of the precursor can be a compound represented by the chemical formula (2).

When the silicon compound is a precursor represented by the chemical formula (2), the production method of the present invention may include a step of hydrolyzing the precursor prior to the gelation step, for example.

The method of hydrolysis is not limited to particular methods, and can be performed by a chemical reaction in the presence of a catalyst, for example. Examples of the catalyst include acids such as an oxalic acid and an acetic acid. The hydrolysis reaction can be performed, for example, by gradually dropping an oxalic acid aqueous solution to a mixture of the silicon compound precursor and dimethylsulfoxide to mix at room temperature, and stirring the resultant for about 30 minutes. In hydrolysis of the silicon compound precursor, for example, by completely hydrolyzing the alkoxy group of the silicon compound precursor, gelation and aging thereafter and heating and immobilization after formation of a void-provided structure can be achieved more efficiently.

In the present invention, the silicon compound can be, for example, a hydrolysate of trimethoxy(methyl)silane.

The monomer silicon compound is not limited to particular compounds, and can be selected appropriately, for example, according to applications of the silicone porous body to be produced. In the production of the silicone porous body, in the case where priority is put on the lowness of refractive index, the silicon compound is preferably the trifunctional silane because it is superior in the lowness of refractive index, and in the case where priority is put on a strength (for example, abrasion resistance), the silicon compound is preferably the tetrafunctional silane because it is superior in an abrasion resistance. Regarding the silicon compounds which are raw materials of the gelled silicon compound, one of the compounds may be used alone or two or more of them may be used in combination, for example. As a specific example, the silicon compound may include only the trifunctional silane, only the tetrafunctional silane, or both of the trifunctional silane and the tetrafunctional silane, and may further include other silicon compounds, for example. When two or more kinds of silicon compounds are used as the silicon compound, the ratio between the compounds is not limited to particular values and can be determined appropriately.

The gelation of the silicon compound can be performed, for example, by a dehydration condensation reaction among the silicon compounds. The dehydration condensation reaction is preferably performed in the presence of a catalyst, for example. Examples of the catalyst include dehydration condensation catalysts such as: acid catalysts including a hydrochloric acid, an oxalic acid, and a sulfuric acid; and base catalysts including ammonia, potassium hydroxide, sodium hydroxide, and ammonium hydroxide. The dehydration condensation catalyst can be an acid catalyst or a base catalyst, and a base catalyst is preferable. In the dehydration condensation reaction, the amount of the catalyst to be added to the silicon compound is not limited to particular values, and is, for example, 0.1 to 10 mol, 0.05 to 7 mol, or 0.1 to 5 mol per mol of the silicon compound.

The gelation of the silicon compound is preferably performed in a solvent, for example. The proportion of the silicon compound in the solvent is not limited to particular values. Examples of the solvent include dimethylsulfoxide (DMSO), N-methylpyrrolidone (NMP), N,N-dimethylacetamide (DMAc), dimethylformamide (DMF), γ-butyrolactone (GBL), acetonitrile (MeCN), and ethylene glycol ethyl ether (EGEE). One of the solvents may be used alone or two or more of them may be used in combination, for example. Hereinafter, the solvent used for the gelation is also referred to as a "gelation solvent".

The condition for the gelation is not limited to particular conditions. Regarding the treatment of the solvent containing the silicon compound, the treatment temperature is, for example, 20° C. to 30° C., 22° C. to 28° C., or 24° C. to 26° C., and the treatment time is, for example, 1 to 60 minutes, 5 to 40 minutes, or 10 to 30 minutes. The treatment condition for the dehydration condensation reaction is not limited to particular conditions, and reference can be made to these examples. Owing to gelation, a siloxane bond is grown and primary particles of the silicon compound are formed. As the reaction further proceeds, the primary particles are connected in the form of a string of beads to generate a gel having a three-dimensional structure, for example.

The gel form of the gelled silicon compound obtained in the gelation step is not limited to particular forms. The "gel" commonly denotes a solidified state of solutes aggregated as they lost independent motility due to interaction. Commonly, a wet gel is a gel containing a dispersion medium in which solutes build a uniform structure, and a xerogel is a gel from which a solvent is removed and in which solutes form a network structure with void spaces. In the present invention, the gelled silicon compound is preferably a wet gel, for example. The amount of the residual silanol group in the gelled silicon compound is not limited to particular values, and can be the above-described range.

The gelled silicon compound obtained by the gelation may be directly subjected to the pulverizing step or the gelled silicon compound may be subjected to aging treatment in the aging step prior to the pulverizing step, for example. In the aging step, the conditions of the aging treatment are not limited to particular conditions. For example, the gelled silicon compound may be incubated at a predetermined temperature in a solvent. The aging treatment causes further growth of the primary particle of a gelled silicon compound having a three-dimensional structure obtained by gelation, for example, and this allows the size of the particle itself to be increased. As a result, the contact state of the neck where particles are in contact with one another can be increased from a point contact to a surface contact, for example. The gelled silicon compound which has been subjected to the aging treatment increases its strength, for example, and this increases the strength of the three-dimensional basic structure of the pulverized product after pulverization. Thereby, in the case of forming the coating film by using the coating material of the present invention, the pore size of the void-provided structure obtained by deposition of the three-dimensional basic structures can be prevented from shrinking in accordance with solvent volatilization in the coating film during the drying process in the drying step after coating of the pulverized product, for example.

Regarding the temperature of the aging treatment, the lower limit thereof is, for example, 30° C. or more, 35° C. or more, or 40° C. or more, the upper limit thereof is, for example, 80° C. or less, 75° C. or less, or 70° C. or less, and the predetermined temperature is, for example, in the range from 30° C. to 80° C., 35° C. to 75° C., or 40° C. to 70° C. The predetermined time is not particularly limited, and the lower limit is, for example, 5 hours or more, 10 hours or more, or 15 hours or more, the upper limit is, for example, 50 hours or less, 40 hours or less, or 30 hours or less, and the predetermined time is, for example, in the range from 5 hours to 50 hours, 10 hours to 40 hours, or 15 hours to 30 hours. As to an optimal condition for the aging, as described above, it is preferable to determine the condition with which the size of the primary particle can be increased and the contact area of the neck can be increased in the gelled silicon compound, for example. Furthermore, in the aging step, it is preferable to determine the temperature of the aging treatment by taking the boiling point of a solvent to be used into consideration, for example. For example, when the aging temperature is too high, there is a possibility that the solvent excessively volatilizes, which causes defectiveness such that the pore of the three-dimensional void-provided structure closes due to the condensation of the concentration of a coating liquid. On the other hand, for example, when the aging temperature is too low, there is a possibility not only that a sufficient effect of the aging is not brought about but also that temperature variations over time in a mass production process increase, which causes products with poor quality to be produced.

The same solvent as the solvent used in the gelation step can be used in the aging treatment, for example. Specifically, the aging treatment is preferably applied to the reactant (the solvent containing the gelled silicon compound) after the gelation treatment. The mol number of residual silanol groups contained in the gelled silicon compound after completion of the aging treatment after gelation is, for example, the proportion of the residual silanol group with the mol number of alkoxy groups of the raw material used for gelation (for example, the silicon compound or the precursor thereof) being considered as 100, and the lower limit thereof is, for example, 1% or more, 3% or more, or 5% or more, the upper limit thereof is, for example, 50% or less, 40% or less, or 30% or less, and the mol number is, for example, in the range from 1% to 50%, 3% to 40%, or 5% to 30%. For the purpose of increasing the hardness of a gelled silicon compound, for example, the lower the mol number of the residual silanol groups, the better. When the mol number of the residual silanol groups is too high, for example, there is a possibility that the void-provided structure cannot be held until crosslinking is done in the precursors of the silicone porous body in formation of the silicone porous body. On the other hand, when the mol number of the residual silanol groups is too low, for example, there is a possibility that crosslinking cannot be done in the precursors of the silicone porous body in the bonding step, which hinders a sufficient film strength from being imparted. Note that while the aforementioned description is described with reference to a residual silanol group as an example, the same phenomenon shall be applied to various functional groups in the case where the silicon compound is modified with various reactive functional groups as the raw material of the gelled silicon compound, for example.

In the present invention, the pulverizing step is a step of pulverizing the gelled silica compound as described above. The pulverization treatment may be applied to the gelled silicon compound (first coating raw material) after the gelation step or may be applied to the gelled silicon compound (second coating raw material) after the aging step, for example.

The gelled silicon compound in the gelation solvent which has not been processed may be pulverized or the gelation solvent may be substituted with another solvent and the gelled silicon compound in the substituted solvent may be pulverized, for example. Furthermore, when the aging treatment is applied to the gelled silicon compound, for example, if the catalyst and solvent used in the gelation step remain after the aging step, which causes gelation of the liquid over time and affects the pot life of the coating material to be finally obtained and decreases the drying efficiency in drying of the coating film formed by using the coating material, it is preferable to substitute the gelation solvent with another solvent. Hereinafter, such a solvent for substitution may be also referred to as a "pulverization solvent".

The same solvent as the solvent used in the gelation step and the aging step or the solvent different from the solvent used in the gelation step and the aging step may be used for the pulverization, for example. In the former case, for example, the reactant (for example, the gelation solvent containing the gelled silicon compound) after the gelation step which has not been processed can be subjected to the aging step and the pulverizing step. In the latter case, the reactant (for example, the gelation solvent containing the gelled silicon compound) after the gelation step which has not been processed may be subjected to the aging step, and then the gelation solvent may be substituted with another solvent and the gelled silicon compound in the substituted solvent may be pulverized.

The pulverization solvent is not limited to particular solvents, and can be, for example, an organic solvent. The organic solvent can be, for example, a solvent having a boiling point at 130° C. or less, 100° C. or less, or 85° C. or less. Specific examples of the organic solvent include isopropyl alcohol (IPA), ethanol, methanol, butanol, propylene glycol monomethyl ether (PGME), methyl cellosolve, acetone, and dimethylformamide (DMF). One of the pulverization solvents may be used alone or two or more of them may be used in combination.

The combination of the gelation solvent and the pulverization solvent is not limited to particular combinations, and the combination can be, for example, the combination of DMBO and IPA, the combination of DMSO and ethanol, the combination of DMBO and methanol, and the combination of DMSO and butanol. Substitution of the gelation solvent with the pulverization solvent makes it possible to form a coating film with uniform quality in the coating film formation described below, for example.

The method of pulverizing the gelled silicon compound is not limited to particular methods. Examples of the apparatus for pulverizing include: pulverizing apparatuses utilizing a cavitation phenomenon such as an ultrasonic homogenizer and a high-speed rotating homogenizer; and pulverizing apparatuses of causing oblique collision of liquids at a high pressure. An apparatus such as a ball mill that performs media pulverization physically destroys the void-provided structure of a gel in pulverization, for example. On the other hand, a cavitation-type pulverizing apparatus such as a homogenizer, which is preferable in the present invention, peels the contact surface of silica particles, which are already contained in a gel three-dimensional structure and bonded relatively weakly, with a high speed shearing force owing to a medialess method, for example. In this manner, a new sol three-dimensional structure can be obtained by pulverizing the gelled silicon compound. The three-dimensional structure allows a void-provided structure having a particle size distribution of a certain range to be held in formation of the coating film and allows a void-provided structure to be formed again by deposition in coating and drying, for example. The condition for the pulverization is not limited to particular conditions, and is preferably a condition that allows a gel to be pulverized without volatilizing a solvent by instantaneously imparting a high speed flow, for example. For example, it is preferable to pulverize the gelled silicon compound so as to obtain pulverized products having the above described particle size variations (for example, volume average particle size or particle size distribution). If the pulverization time, the pulverization strength, or the like is lacking, for example, there is a possibility not only that coarse particles remain, which hinders dense pores from being formed but also that defects in appearance increase, which hinders high quality from being achieved. On the other hand, if the pulverization time, the pulverization strength, or the like is too much, for example, there is a possibility that a finer sol particle than a desired particle size distribution is obtained and the size of a void space obtained by deposition after coating and drying is too fine to satisfy a desired porosity.

The proportion of the residual silanol group contained in the pulverized product after the pulverizing step is not limited to particular values and is, for example, the same as the range described as to the gelled silicon compound after the aging treatment.

The proportion of the pulverized product in the solvent containing the pulverized product after the pulverizing step is not limited to particular values and can be, for example, the condition described as to the coating material of the present invention. The proportion can be, for example, the condition of the solvent containing the pulverized product after the pulverizing step or the condition of the solvent adjusted after the pulverizing step and before the use as a coating material.

The coating material of the present invention can be produced by using the first coating raw material or the second coating raw material, for example. The first coating raw material includes a gelled silicon compound obtained from a silicon compound containing at least three or less functional groups having saturated bonds as described above. The production method of the first coating raw material includes, for example, a step of causing gelation of the silicon compound in a solvent to generate a gelled silicon compound, and reference can be made to the description as to the gelled silicon compound after the gelation step, for example. The second coating raw material includes a gelled silicon compound, which is a gelled product obtained from a silicon compound containing at least three or less functional groups having saturated bonds, that has been subjected to aging treatment as described above. The production method of the second coating raw material includes, for example, a step of aging the gelled silicon compound obtained from the silicon compound in a solvent, and reference can be made to the description as to the gelled silicon compound after the aging step, for example.

In the manner described above, the coating material of the present invention containing pulverized products of a gelled silicon compound and a dispersion medium can be prepared. A catalyst for chemically bonding the pulverized products may be further added to the coating material of the present invention during or after the preparation steps. The amount of the catalyst to be added is not limited to particular values, and is, for example, in the range from 0.01 wt % to 20 wt %, 0.05 wt % to 10 wt %, or 0.1 wt % to 5 wt % relative to the weight of the pulverized product of the gelled silicon compound. Owing to the catalyst, the pulverized products are chemically bonded in the bonding step described below, for example. The catalyst may be, for example, a catalyst that promotes the crosslinking bond among the pulverized products. As the chemical reaction of chemically bonding the pulverized products, it is preferable to utilize the dehydration condensation reaction of a residual silanol group contained in a silica sol molecule. By promoting the reaction between the hydroxyl groups of the silanol group by the catalyst, the continuous formation of a film in which the void-provided structure is cured in a short time can be performed. Examples of the catalyst include photoactive catalysts and thermoactive catalysts. The photoactive catalyst allows the chemical bond (for example, crosslinking bond) among the pulverized products without heating, for example. This makes it possible to maintain a higher proportion of void space because the shrinkage due to heating is less liable to occur, for example. In addition to or instead of the catalyst, a substance (catalyst generator) that generates a catalyst may be used. For example, the catalyst may be a crosslinking reaction accelerator and the catalyst generator may be a substance that generates the crosslinking reaction accelerator. For example, in addition to or instead of the photoactive catalyst, a substance (photocatalyst generator) that generates a catalyst by light irradiation may be used. For example, in addition to or instead of the thermoactive catalyst, a substance (thermal catalyst generator) that generates a catalyst by heating may be used. The photocatalyst generator is not limited to particular photocatalyst generators, and examples thereof include photobase generators (substances that generate basic catalysts by light irradiation) and photoacid generators (substances that generate acidic catalysts by light irradiation). Among them, the photobase generator is preferable. Examples of the photobase generator include 9-anthrylmethyl N,N-diethylcarbamate (product name: WPBG-018), (E)-1-[3-(2-hydroxyphenyl)-2-propenoyl]piperidine (product name: WPBG-027), 1-(anthraquinon-2-yl)ethyl imidazolecarboxylate (product name: WPBG-140), 2-nitrophenylmethyl 4-methacryloyloxypiperidine-1-carboxylate (product name: WPBG-165), 1,2-diisopropyl-3-[bis(dimethylamino) methylene]guanidium 2-(3-benzoylphenyl)propionate (product name: WPBG-266), 1,2-dicyclohexyl-4,4,5,5-tetramethylbiguanidium n-butyltriphenylborate (product name: WPBG-300), 2-(9-oxoxanthen-2-yl)propionic acid 1,5,7-triazabicyclo[4.4.0]dec-5-ene (Tokyo Kasei Kogyo Co., Ltd.), and a compound containing 4-piperidinemethanol (product of Heraeus, product name: HDPD-PB100). Note here that each product with the name including "WPBG" is a product of Wako Pure Chemical Industries, Ltd. Examples of the photoacid generator include aromatic sulfonium salt (product of ADEKA, product name: SP-170), triarylsulfonium salt (product of San-Apro Ltd., product name: CPI101A), and aromatic iodonium salt (product of Ciba Japan, product name: Irgacure 250). The catalyst for chemically bonding the pulverized products is not limited to the photoactive catalyst and the photocatalyst generator, and can be, for example, a thermoactive catalyst or a thermal catalyst generator such as urea. Examples of the catalyst for chemically bonding the pulverized products include base catalysts such as potassium hydroxide, sodium hydroxide, and ammonium hydroxide; and acid catalysts such as a hydrochloric acid, an acetic acid, and an oxalic acid. Among them, the base catalyst is preferable. The catalyst for chemically bonding the pulverized products can be used by adding it to a sol particle liquid (for example, suspension) containing the pulverized products right before the coating, or the catalyst can be used as a mixture by mixing it with a solvent, for example. The mixture may be, for example, a coating liquid obtained by adding the catalyst directly to the sol particle liquid, a solution obtained by dissolving the catalyst in a solvent, or a dispersion liquid obtained by dispersing the catalyst into a solvent. The solvent is not limited to particular solvents, and examples thereof include various organic solvents, water, and buffer solutions.

For example, a crosslinking assisting agent for indirectly bonding the pulverized products of the gelled silicon compound may further be added to the coating material of the present invention. This crosslinking assisting agent penetrates among particles (pulverized products) and interacts with or bonds to the particles, which helps to bond particles relatively distanced from one another and makes it possible to increase the strength efficiently. As the crosslinking assisting agent, a multicrosslinking silane monomer is preferable. Specifically, the multicrosslinking silane monomer may have at least two and at most three alkoxysilyl groups, the chain length between the alkoxysilyl groups may be 1-10C, and the multicrosslinking silane monomer may contain an element other than carbon, for example. Examples of the crosslinking assisting agent include bis(trimethoxysilyl)ethane, bis(triethoxysilyl)ethane, bis(trimethoxysilyl)methane, bis(triethoxysilyl)methane, bis(triethoxysilyl)propane, bis(trimethoxysilyl)propane, bis(triethoxysilyl)butane, bis(trimethoxysilyl)butane, bis(triethoxysilyl)pentane, bis(trimethoxysilyl)pentane, bis(triethoxysilyl)hexane, bis(trimethoxysilyl)hexane, bis(trimethoxysilyl)-N-butyl-N-propyl-ethane-1,2-diamine, tris-(3-trimethoxysilylpropylisocyanurate, and tris-(3-triethoxysilylpropyDisocyanurate. The amount of the crosslinking assisting agent to be added is not limited to particular values, and the amount of the crosslinking assisting agent to be added relative to the weight of the pulverized product of the silicon compound is, for example, in the range from 0.01 wt % to 20 wt %, 0.05 wt % to 15 wt %, or 0.1 wt % to 10 wt %.

[2. Usage of Coating Material]

As the usage of the coating material of the present invention, the method of producing a silicone porous body is described below as an example. However, the present invention is not limited thereto. Hereinafter, the silicone porous body produced by using the coating material of the present invention may also be referred to as the "the silicone porous body of the present invention".

The production method of the silicone porous body includes: steps of forming the precursor of the silicone porous body by using the coating material of the present invention; and chemically bonding the pulverized products of the coating material contained in the precursor, for example. The precursor can be also referred to as a coating film, for example.

According to the production method of the silicone porous body, a porous structure having a function equivalent to that of an air layer can be formed, for example. The following theory about the reason for this can be formed. The present invention, however, is not limited thereto.

In the coating material of the present invention for use in the production method of the silicone porous body including the pulverized products of the gelled silicon compound, the three-dimensional structure of the gelled silica compound is dispersed into three-dimensional basic structures. Thus, in the production method of the silicone porous body, for example, when the precursor (for example, coating film) is formed by using the coating material, the three-dimensional basic structures are deposited and the void-provided structure based on the three-dimensional basic structure is formed. That is, according to the production method of the silicone porous body, a new three-dimensional structure is formed by the pulverized products each having the three-dimensional basic structure, which is different from the three-dimensional structure of the gelled silicon compound. Moreover, in the production method of the silicone porous body, since the pulverized products are chemically bonded, the new three-dimensional structure is immobilized. Thus, the silicone porous body obtained by the production method of the silicone porous body, despite its structure with void spaces, can maintain a sufficient strength and sufficient flexibility. The silicone porous body obtained by the present invention can be used, as a member utilizing void spaces, for products in a wide range of fields including heat insulating materials, sound absorbing materials, optical elements, and ink image receiving layers. Furthermore, the silicone porous body obtained by the present invention allows a laminated film having various functions to be produced, for example.

Regarding the production method of the silicone porous body, reference can be made to the description as to the coating material of the present invention unless otherwise stated.

In the step of forming the precursor of the porous body, for example, the base is coated with the coating material of the present invention. After coating the base with the coating material of the present invention and drying the coating film, by chemically bonding (for example, crosslinking) the pulverized products in the bonding step, the continuous formation of a void-provided layer having a film strength of a certain level or more can be performed.

The coating amount of the coating material relative to the base is not limited to particular values, and can be determined appropriately, for example, according to the thickness of a desired silicone porous body. As a specific example, in the case of forming the silicone porous body having a thickness of 0.1 to 1000 μm, the coating amount of the coating material relative to the base is, for example, in the range from 0.01 to 60000 μg, 0.1 to 5000 μg, or 1 to 50 μg per square meter of the base. Although it is difficult to uniquely define a preferable coating amount of the coating material because it depends on the concentration of a liquid, the coating method, or the like, for example, it is preferable that a coating layer is as thin as possible in consideration of productivity. When the coating amount is too much, for example, there is a high possibility that a solvent is dried in a drying oven before volatilizing. When the solvent is dried before forming the void-provided structure by the settlement and deposition of the nano pulverized sol particles in the solvent, there is a possibility that formation of void spaces is inhibited and the proportion of void space decreases. On the other hand, when the coating amount is too little, there is a possibility of increasing the risk of causing coating cissing due to unevenness of a base, variations in hydrophilicity and hydrophobicity and the like.

After coating the base with the coating material, drying treatment may be applied to the precursor of the porous body (coating film). The drying treatment is aimed not only for removing the solvent (solvent contained in the coating material) from the precursor of the porous body but also for causing the settlement and deposition of the sol particles to form a void-provided structure during the drying treatment, for example. The temperature for the drying treatment is, for example, in the range from 50° C. to 250° C., 60° C. to 150° C., or 70° C. to 130° C., and the time for the drying treatment is, for example, in the range from 0.1 to 30 minutes, 0.2 to 10 minutes, or 0.3 to 3 minutes. Regarding the temperature and time for the drying treatment in relation to continuous productivity and high porosity expression, the lower the better and the shorter the better, for example. When the condition is too strict, there is a possibility of causing the following problem, for example. That is, when the base is a resin film, for example, the base extends in a drying oven as the temperature approaches the glass-transition temperature of the base, which causes defects such as cracks in a formed void-provided structure right after coating. On the other hand, when the condition is too mild, there is a possibility of causing the following problem, for example. That is, since the film contains a residual solvent when it comes out of the drying oven, defects in appearance such as scratches are caused when the film rubs against a roller in the next step.

The drying treatment may be, for example, natural drying, drying by heating, or drying under reduced pressure. The drying method is not limited to particular methods, and a common heating unit can be used, for example. Examples of the heating unit include a hot air fan, a heating roll, and a far-infrared heater. Among them, in view of performing continuous production industrially, drying by heating is preferable. The solvent to be used is preferably a solvent having a low surface tension in view of reducing the shrinkage stress in accordance with the solvent volatilization in drying and reducing the crack phenomenon of the void-provided layer (the silicone porous body) due to the shrinkage stress. The solvent can be, for example, lower alcohol typified by isopropyl alcohol (IPA), hexane, perfluorohexane, and the like. The solvent, however, is not limited thereto. The surface tension may be reduced by adding a small amount of a perfluoro surfactant or a small amount of a silicon surfactant to the IPA and the like.

The base is not limited to particular bases. For example, a base made of thermoplastic resin, a base made of glass, an inorganic base typified by silicon, plastic molded using thermosetting resin or the like, an element such as a semiconductor, a carbon fiber material typified by carbon nanotube, or the like can be preferably used. The base, however, is not limited thereto. Examples of the form of the base include a film and a plate. Examples of the thermoplastic resin include polyethylene terephthalate (PET), acryl, cellulose acetate propionate (CAP), cycloolefin polymer (COP), triacetate (TAC), polyethylene naphthalate (PEN), polyethylene (PE), and polypropylene (PP).

In the production method of the silicone porous body, the bonding step is a step of chemically bonding the pulverized products contained in the precursor of the porous body (coating film). The three-dimensional structure of the pulverized product in the precursor of the porous body is immobilized in the bonding step, for example. In the case of immobilizing the three-dimensional structure by conventional sintering, for example, the dehydration condensation of a silanol group and the formation of a siloxane bond are induced by high temperature treatment at 200° C. or more. In the bonding step of the present invention, for example, when a base is a resin film, the void-provided structure can be formed and immobilized continuously at about 100° C. which is relatively low for less than several minutes which is short without damaging the base by causing various additives, which catalyze the dehydration condensation reaction, to react.

The method of chemically bonding the particles is not limited to particular methods, and can be determined appropriately according to the type of the gelled silicon compound, for example. Specifically, for example, the chemical bond can be a chemical crosslinking bond among the pulverized products. Besides this, for example, when inorganic particles such as titanium oxide particles are added to the pulverized products, the inorganic particles and the pulverized products can be chemically bonded by crosslinking. Furthermore, there are a case of using a biocatalyst such as an enzyme and a case of chemically crosslinking the pulverized product and a catalyst at a site which is different from a catalytic activity site. Thus, the present invention can be applied not only to a void-provided layer (silicone porous body) formed of the sol particles but also to an organic-inorganic hybrid void-provided layer, a host-guest void-provided layer, and the like, for example. The present invention, however, is not limited thereto.

The bonding step can be carried out by a chemical reaction in the presence of a catalyst according to the type of the pulverized product of the gelled silicon compound, for example. The chemical reaction in the present invention is preferably a reaction utilizing a dehydration condensation reaction of a residual silanol group contained in the pulverized product of the gelled silicon compound. By promoting the reaction between the hydroxyl groups of the silanol group by the catalyst, the continuous formation of a film in which the void-provided structure is cured in a short time can be performed. Examples of the catalyst include: base catalysts such as potassium hydroxide, sodium hydroxide, and ammonium hydroxide; and acid catalysts such as a hydrochloric acid, an acetic acid, and an oxalic acid. The catalyst, however, is not limited thereto. The catalyst used in the dehydration condensation reaction is particularly preferably a base catalyst. Furthermore, photoacid generation catalysts, photobase generation catalysts, photoacid generators, photobase generators, and the like, each of which expresses a catalytic activity by light (for example, ultraviolet) irradiation, may preferably be used. The photoacid generation catalysts, photobase generation catalysts, photoacid generators, and photobase generators are not limited to particular catalysts, and can be, for example, as described above. Preferably, the catalyst is used by adding it to the sol particle liquid containing the pulverized products right before the coating or the catalyst is used as a mixture by mixing it with a solvent, for example. The mixture may be, for example, a coating liquid obtained by adding the catalyst directly to the sol particle liquid, a solution obtained by dissolving the catalyst in a solvent, or a dispersion liquid obtained by dispersing the catalyst into a solvent. The solvent is not limited to particular solvents as described above, and examples thereof include water and buffer solutions.

The chemical reaction in the presence of the catalyst can be performed, for example, by heating the coating film containing the catalyst preliminarily added to the coating material or irradiating the coating film containing the catalyst preliminarily added to the coating material with light, by heating the coating film or irradiating the coating film with light after the catalyst has been sprayed to the coating film, or by heating the coating film or irradiating the coating film with light while spraying the catalyst to the coating film. For example, when the catalyst is a photoactive catalyst, the silicone porous body can be formed by chemically bonding the pulverized products by light irradiation. When the catalyst is a thermoactive catalyst, the silicone porous body can be formed by chemically bonding the pulverized products by heating. The light amount in the light irradiation is not limited to particular values, and is, for example, in the range from 200 to 800 mJ/cm$^2$, 250 to 600 mJ/cm$^2$, or 300 to 400 mJ/cm$^2$ in terms of the wave length at 360 nm. From the view point of preventing the effect from being insufficient due to the delay of decomposition of the catalyst generator by light absorption because of insufficient irradiation amount, the accumulated light amount is preferably 200 mJ/cm$^2$ or more. From the view point of preventing heat wrinkles from generating due to the damage on a base below a void-provided layer, the accumulated light amount is preferably 800 mJ/cm$^2$ or less. The conditions for the heat treatment are not limited to particular conditions. The heating temperature is, for example, 50° C. to 250° C., 60° C. to 150° C., or 70° C. to 130° C., the heating time is, for example, 0.1 to 30 minutes, 0.2 to 10 minutes, or 0.3 to 3 minutes. The solvent to be used is preferably a solvent having a low surface tension in view of reducing the shrinkage stress in accordance with the solvent volatilization in drying and reducing the crack phenomenon of the void-provided layer due to the shrinkage stress, for example. The solvent can be, for example, lower alcohol typified by isopropyl alcohol (IPA), hexane, perfluorohexane, or the like. The solvent, however, is not limited thereto.

In the manner described above, the silicone porous body of the present invention can be produced. The production method of the present invention, however, is not limited thereto.

The thus obtained silicone porous body of the present invention may be subjected to a strength increasing step (hereinafter, also referred to as an "aging step") of applying thermal aging to increase the strength, for example. For example, when the silicone porous body of the present invention is stacked on a resin film, the peel strength to the resin film can be increased by the strength increasing step (aging step). In the strength increasing step (aging step), for example, the silicone porous body of the present invention may be heated. The temperature of the aging step is, for example, 40° C. to 80° C., 50° C. to 70° C., or 55° C. to 65° C. The time for the reaction is, for example, 5 to 30 hours, 7 to 25 hours, or 10 to 20 hours. By setting the heating temperature low in the aging step, for example, the peel strength can be increased while reducing the shrinkage of the silicone porous body, thereby achieving both a high proportion of void space and strength.

While the phenomenon and mechanism caused in the strength increasing step (aging step) are unknown, for example, it is considered that the catalyst contained in the silicone porous body of the present invention promotes the chemical bond (for example, crosslinking reaction) among the pulverized products, thereby increasing the strength. As a specific example, when residual silanol groups (OH groups) are present in the silicone porous body, it is considered that the residual silanol groups are chemically bonded by a crosslinking reaction. The catalyst contained in the silicone porous body of the present invention is not limited to particular catalysts, and can be, for example, a catalyst used in the bonding step, a basic substance generated by the photobase generation catalyst used in the bonding step by light irradiation, or an acidic substance generated by the photoacid generation catalyst used in the bonding step by light irradiation. The description, however, is illustrative and does not limit the present invention.

A pressure-sensitive adhesive/adhesive layer may additionally be formed on the silicone porous body of the present invention (pressure-sensitive adhesive/adhesive layer forming step). Specifically, for example, the pressure-sensitive adhesive/adhesive layer may be formed by applying a pressure-sensitive adhesive or an adhesive to the silicone porous body of the present invention. The pressure-sensitive adhesive/adhesive layer may be formed on the silicone porous body of the present invention using an adhesive tape, in which the pressure-sensitive adhesive/adhesive layer is stacked on a base, by adhering the pressure-sensitive adhesive/adhesive layer side of the adhesive tape on the silicone porous body of the present invention. In this case, the base of the adhesive tape may be kept adhered or peeled from the pressure-sensitive adhesive/adhesive layer. In the present invention, a "pressure-sensitive adhesive" and a "pressure-sensitive adhesive layer" are used based on the premise that an adherend is re-peelable, for example. In the present invention, an "adhesive" and an "adhesive layer" are used based on the premise that an adherend is not re-peelable, for example. In the present invention, however, the "pressure-sensitive adhesive" and the "adhesive" are not always distinguishable and the "pressure-sensitive adhesive layer" and the "adhesive layer" are not always distinguishable. In the present invention, there is no particular limitation on the pressure-sensitive adhesives or the adhesives for forming the pressure-sensitive adhesive/adhesive layer, and a common pressure-sensitive adhesive or adhesive can be used, for example. Examples of the pressure-sensitive adhesive and the adhesive include polymer adhesives such as acrylic adhesives, vinyl alcohol adhesives, silicone adhesives, polyester adhesives, polyurethane adhesives, and polyether adhesives; and rubber adhesives. Furthermore, the pressure-sensitive adhesive and the adhesive can be an adhesive including a water-soluble crosslinking agent of vinyl alcohol polymer such as glutaraldehyde, melamine, or an oxalic acid. One type of the pressure-sensitive adhesives and adhesives may be used alone or two or more types of them may be used in combination (for example, mixing, lamination, and the like). The thickness of the pressure-sensitive adhesive/adhesive layer is not limited to particular values, and is, for example, 0.1 to 100 μm, 5 to 50 μm, 10 to 30 μm, or 12 to 25 μm.

Furthermore, an intermediate layer may be formed between the silicone porous body of the present invention and the pressure-sensitive adhesive/adhesive layer by causing the silicone porous body of the present invention to react with the pressure-sensitive adhesive/adhesive layer (intermediate layer forming step). Owing to the intermediate layer, the silicone porous body of the present invention and the pressure-sensitive adhesive/adhesive layer are not easily peeled from each other, for example. While the reason (mechanism) for this is unknown, it is presumed that the silicone porous body of the present invention and the pressure-sensitive adhesive/adhesive layer are not easily peeled from each other owing to the anchoring property (anchor effect) of the intermediate layer, for example. The anchoring property (anchor effect) is a phenomenon (effect) that the interface between the void-provided layer and the intermediate layer is strongly fixed because the intermediate layer is entangled in the void-provided layer in the vicinity of the interface. This reason (mechanism), however, is an example of a presumable reason (mechanism), and does not limit the present invention. The reaction between the silicone porous body of the present invention and the pressure-sensitive adhesive/adhesive layer is not limited to particular reactions, and can be, for example, a reaction by catalysis. The catalyst may be a catalyst contained in the silicone porous body of the present invention, for example. Specifically, the catalyst can be, for example, a catalyst used in the bonding step, a basic substance generated by the photobase generation catalyst used in the bonding step by light irradiation, or an acidic substance generated by the photoacid generation catalyst used in the bonding step by light irradiation. The reaction between the silicone porous body of the present invention and the pressure-sensitive adhesive/adhesive layer may be, for example, a reaction (for example, crosslinking reaction) that generates a new chemical bond. The temperature of the reaction is, for example, 40° C. to 80° C., 50° C. to 70° C., or 55° C. to 65° C. The time for the reaction is, for example, 5 to 30 hours, 7 to 25 hours, or 10 to 20 hours. This intermediate layer forming step may also serve as the strength increasing step (aging step) of increasing the strength of the silicone porous body of the present invention.

The thus obtained silicone porous body of the present invention may further be stacked on another film (layer) to form a laminate having the porous structure, for example. In this case, the components of the laminate may be stacked through a pressure-sensitive adhesive or an adhesive, for example.

The components may be stacked by continuous treatment (so called Roll to Roll) using a long film, for example, in terms of efficiency. When the base is a molded product, an element, or the like, the base that has been subjected to a batch process may be stacked.

The method of forming the silicone porous body on a base using the coating material of the present invention is described below with reference to FIGS. 1 to 3 as an example. FIG. 2 shows a step of adhering a protective film to a formed film of the silicone porous body and winding the laminate. In the case of stacking the silicone porous body on another functional film, the aforementioned method may be adopted or the formed film of the silicone porous body may be adhered to another functional film that has been coated and dried, right before winding. The method of forming a film shown in FIG. 2 is an example, and the present invention is not limited thereto.

Figure 2:
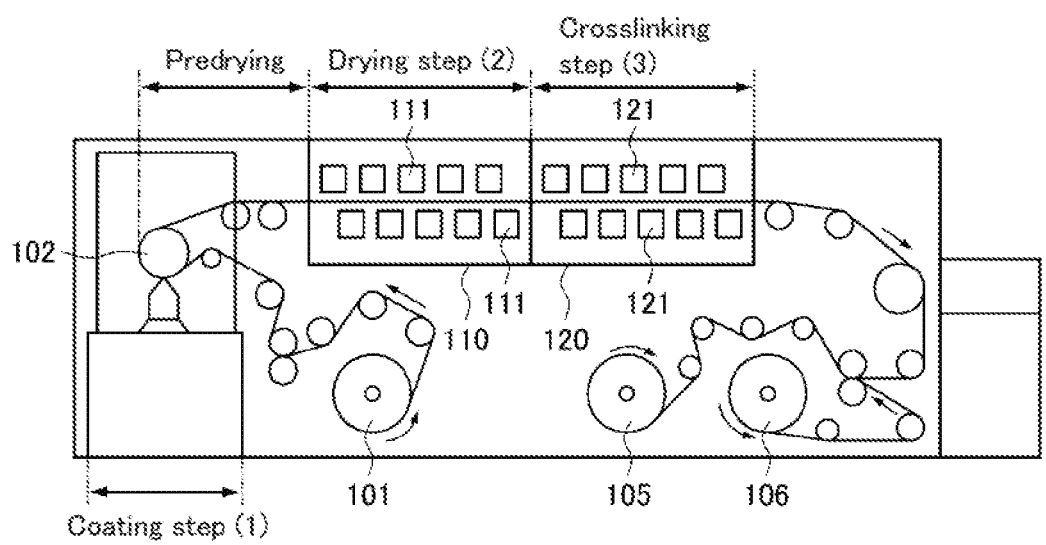
FIG. 2 is an illustration schematically showing an example of a part of the process of producing a silicone porous body by using a coating material of the present invention and an example of the apparatus used therefor.

FIG. 1 is a cross sectional view schematically showing an example of the process of forming the silicone porous body on the base. In FIG. 1, the method of forming a silicone porous body includes: (1) a coating step of coating a base 10 with the coating material of the present invention 20"; (2) a coating film forming step (drying step) of drying the coating material 20" to form a coating film 20' which is the precursor layer of the silicone porous body; and (3) a chemical treatment step (for example, a crosslinking treatment step) of applying chemical treatment (for example, crosslinking treatment) to the coating film 20' to form a silicone porous body 20. In this manner, as shown in FIG. 1, the silicone porous body 20 can be formed on the base 10. The method of forming a silicone porous body may include steps other than the steps (1) to (3) appropriately.

In the coating step (1), the method of coating the base with the coating material 20" is not limited to particular methods, and a common method can be adopted. Examples of the method include a slot die method, a reverse gravure coating method, a micro-gravure method (micro-gravure coating method), a dip method (dip coating method), a spin coating method, a brush coating method, a roller coating method, a flexography, a wire-bar coating method, a spray coating method, an extrusion coating method, a curtain coating method, and a reverse coating method. Among them, from the viewpoint of productivity, smoothness of a coating film, and the like, an extrusion coating method, a curtain coating method, a roller coating method, a micro-gravure coating method, and the like are preferable. The coating amount of the coating material 20" is not limited to particular values, and can be determined appropriately so as to obtain a porous structure (silicone porous body) 20 having an appropriate thickness, for example. The thickness of the porous structure (silicone porous body) 20 is not limited to particular values, and is, for example, as described above.

In (2) the drying step, the coating material 20" is dried (i.e., dispersion medium contained in coating material 20" is removed) to form a coating film (precursor layer) 20'. There is no particular limitation on the condition for the drying treatment, and is as described above.

In (3) the chemical treatment step, the coating film 20' containing the catalyst (for example, photoactive catalyst or thermoactive catalyst such as KOH) which has been added before coating is irradiated with light or heated to chemically bond (for example, crosslink) the pulverized products in the coating film (precursor) 20', thereby forming a silicone porous body 20. The conditions for the light irradiation and heating in (3) the chemical treatment step are not limited to particular conditions, and are as described above.

FIG. 2 schematically shows an example of a slot die coating apparatus and an example of the method of forming a silicone porous body using the same. Although FIG. 2 is a cross sectional view, hatching is omitted for viewability.

As shown in FIG. 2, the steps of the method using this apparatus are carried out while carrying a base 10 in one direction by rollers. The carrying speed is not limited to particular values, and is, for example, in the range from 1 to 100 m/min, 3 to 50 m/min, or 5 to 30 m/min.

First, the base 10 is delivered from a delivery roller 101 and carried to a coating roller 102, and (1) the coating step of coating the base with a coating material of the present invention 20" is carried out using the coating roller 102. Subsequently, (2) the drying step is carried out in an oven zone 110. In the coating apparatus shown in FIG. 2, a predrying step is carried out after (1) the coating step and before (2) the drying step. The predrying step can be carried out at room temperature without heating. In (2) the drying step, a heating unit 111 is used. As the heating unit 111, as described above, a hot air fan, a heating roll, a far-infrared heater, or the like can be used appropriately. For example, (2) the drying step may be divided into multiple steps, and the drying temperature may be set higher as coming to later steps.

After (2) the drying step, (3) the chemical treatment step is carried out in a chemical treatment zone 120. In (3) the chemical treatment step, for example, when the coating film 20' after drying contains a photoactive catalyst, light is emitted from lamps (light irradiation units) 121 disposed above and below the base 10. On the other hand, for example, when the coating film 20' after drying contains a thermoactive catalyst, the base 10 is heated using hot air fans 121 disposed above and below the base 10 instead of using the lamps (light irradiation devices) 121. By this crosslinking treatment, the pulverized products in the coating film 20' are chemically bonded, and the silicone porous body 20 is cured and strengthened. After (3) the chemical treatment step, a laminate in which the silicone porous body 20 is formed on the base 10 is wound by a winding roller 105. In FIG. 2, the porous structure 20, which is a laminate, is protected by coating with a protecting sheet delivered from a roller 106. Instead of the protecting sheet, another layer formed of a long film may be stacked on the porous structure 20.

Figure 3:
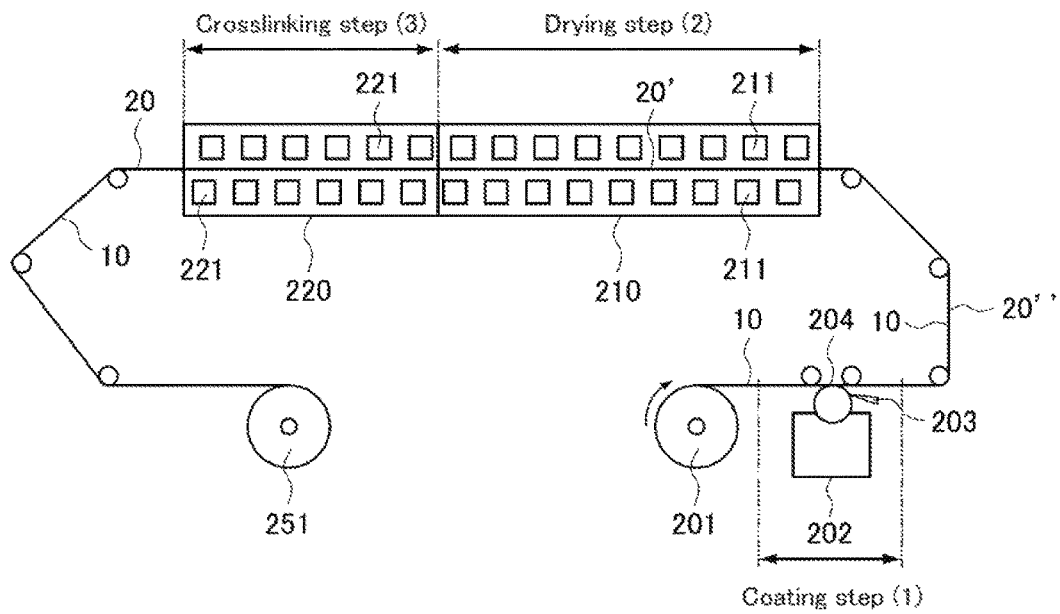
FIG. 3 is an illustration schematically showing another example of a part of the process of producing a silicone porous body by using a coating material of the present invention and another example of the apparatus used therefor.

FIG. 3 schematically shows an example of a micro-gravure coating apparatus and an example of the method of forming a porous structure using the same. Although FIG. 3 is a cross sectional view, hatching is omitted for viewability.

As shown in FIG. 3, the steps of the method using this apparatus are carried out while carrying the base 10 in one direction by rollers as in FIG. 2. The carrying speed is not limited to particular values, and is, for example, in the range from 1 to 100 m/min, 3 to 50 m/min, or 5 to 30 m/min.

First, (1) the coating step of coating the base 10 with the coating material of the present invention 20" is carried out while carrying the base 10 delivered from a delivery roller 201. As shown in FIG. 3, the coating with the coating material 20" is performed using a liquid reservoir 202, a doctor (doctor knife) 203, and a micro-gravure 204. Specifically, the coating material 20" in the liquid reservoir 202 is applied to the surface of the micro-gravure 204 and the coating of the surface of the base 10 is performed using the micro-gravure 204 while controlling the thickness to a predetermined thickness using a doctor 203. The micro-gravure 204 is merely illustrative. The present invention is not limited thereto, and any other coating unit may be adopted.

Subsequently (2) the drying step is performed. Specifically, as shown in FIG. 3, the base 10 coated with the coating material 20" is carried into an oven zone 210 and dried by heating using heating units 211 disposed in the oven zone

210. The heating units 211 can be, for example, the same as those shown in FIG. 2. For example, (2) the drying step may be divided into multiple steps by dividing the oven zone 210 into multiple sections, and the drying temperature may be set higher as coming to later steps. After (2) the drying step, (3) the chemical treatment step is carried out in a chemical treatment zone 220. In (3) the chemical treatment step, for example, when the coating film 20' after drying contains a photoactive catalyst, light is emitted from lamps (light irradiation units) 221 disposed above and below the base 10. On the other hand, for example, when the coating film 20' after drying contains a thermoactive catalyst, the base 10 is heated using hot air fans (heating units) 221 disposed below the base 10 instead of using the lamps (light irradiation devices) 221. By this crosslinking treatment, the pulverized products in the coating film 20' are chemically bonded, and the silicone porous body 20 is formed.

After (3) the chemical treatment step, a laminate in which the silicone porous body 20 is formed on the base 10 is wound by a winding roller 251. Thereafter, for example, another layer may be stacked on the laminate. Furthermore, another layer may be stacked on the laminate before winding the laminate by the winding roller 251, for example.

Figure 4:
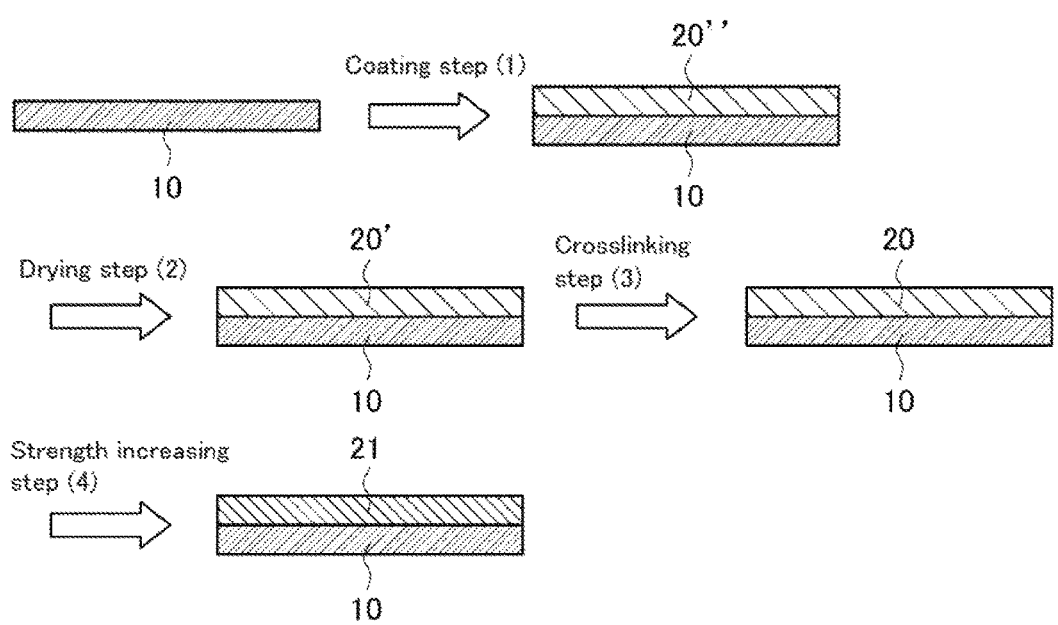
FIG. 4 is a process cross sectional view schematically showing another example of the method of forming a silicone porous body on a base in the present invention.
Figure 5:
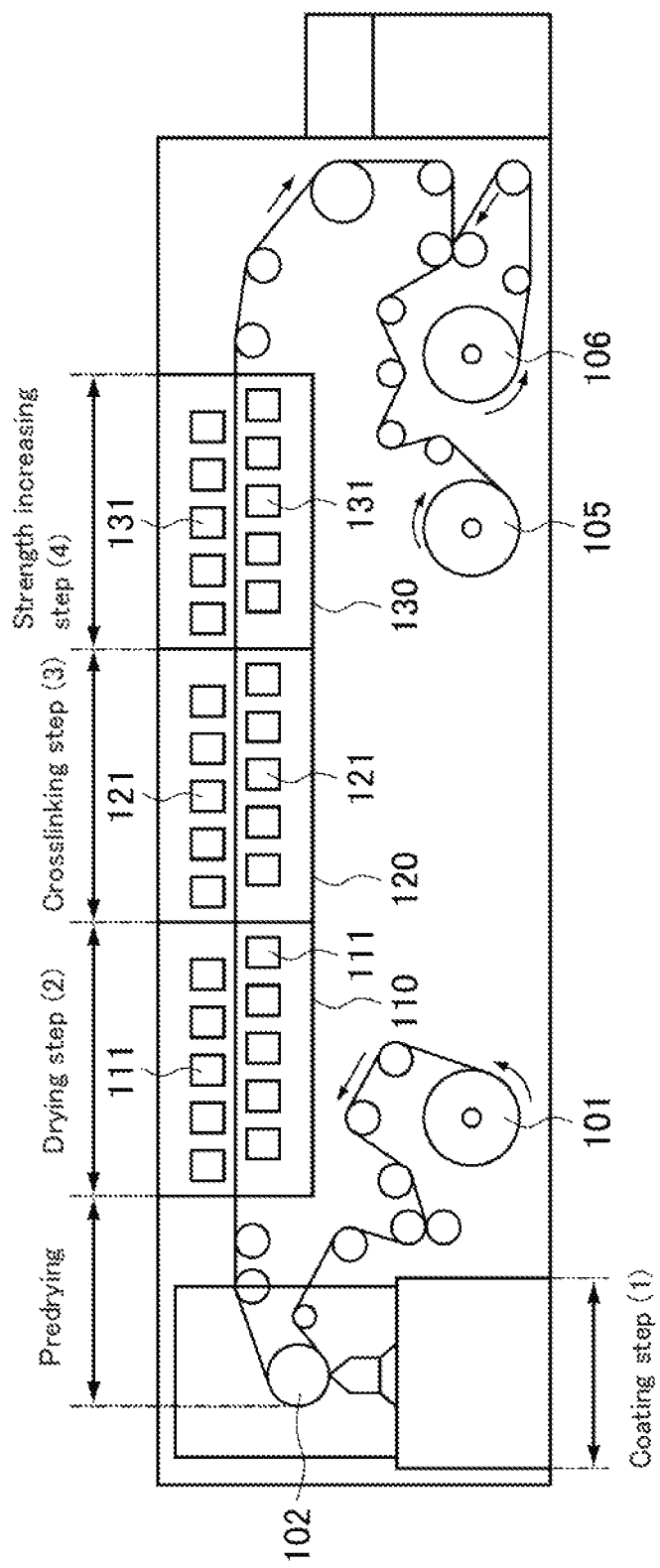
FIG. 5 is an illustration schematically showing still another example of a part of the process of producing a silicone porous body by using a coating material of the present invention and still another example of the apparatus used therefor.
Figure 6:
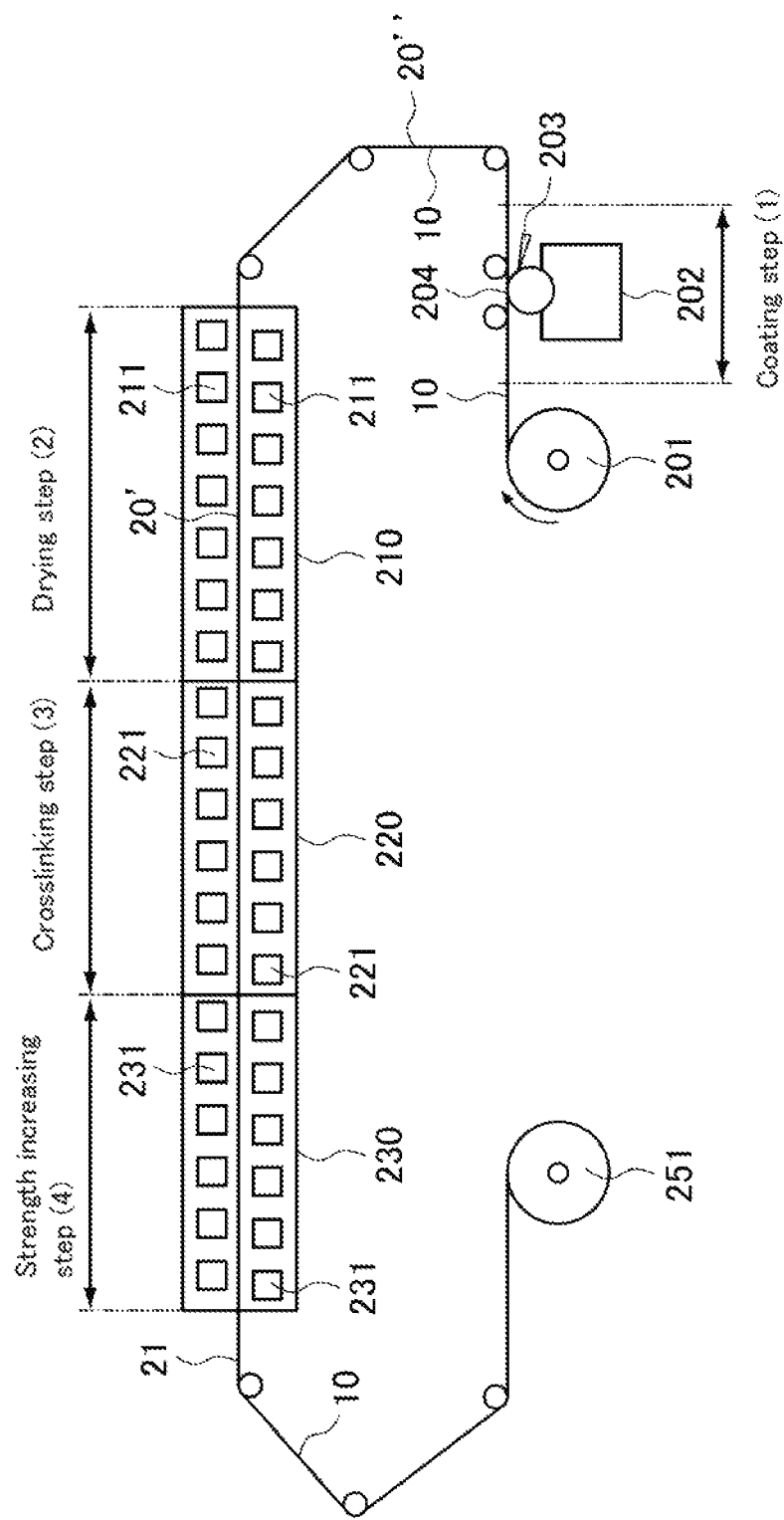
FIG. 6 is an illustration schematically showing still another example of a part of the process of producing a silicone porous body by using a coating material of the present invention and still another example of the apparatus used therefor.

FIGS. 4 to 6 show another example of a continuous treatment process of forming a silicone porous body of the present invention. As shown in the cross sectional view of FIG. 4, this method is the same as the method shown in FIGS. 1 to 3 except that (4) strength increasing step (aging step) is carried out after (3) the chemical treatment step (for example, crosslinking treatment step) of forming a silicone porous body 20. As shown in FIG. 4, the strength of the silicone porous body 20 is increased in (4) the strength increasing step (aging step), thereby forming a silicone porous body 21 with a greater strength. There is no particular limitation on (4) the strength increasing step (aging step), and can be, for example, as described above.

FIG. 5 is a schematic view showing an example of a slot die coating apparatus and an example of the method of forming a silicone porous body using the same, which are different from those shown in FIG. 2. As can be seen, the coating apparatus shown in FIG. 5 is the same as the apparatus shown in FIG. 2 except that the apparatus shown in FIG. 5 includes a strength increasing zone (aging zone) 130 where (4) the strength increasing step (aging step) is carried out right next to the chemical treatment zone 120 where (3) the chemical treatment step is carried out. That is, after (3) the chemical treatment step, (4) the strength increasing step (aging step) is carried out in the strength increasing zone (aging zone) 130 to increase the peel strength of the silicone porous body 20 relative to a resin film 10, thereby forming a silicone porous body 21 having a higher peel strength. For example, (4) the strength increasing step (aging step) may be carried out by heating the silicone porous body 20 in the same manner as described above using hot air fans (heating units) 131 disposed above and below the base 10. The conditions including the heating temperature, the time, and the like are not limited to particular values, and can be, for example, as described above. After (4) the strength increasing step, similar to the process shown in FIG. 3, a laminated film in which the silicone porous body 21 is formed on the base 10 is wound by a winding roller 105.

FIG. 6 is a schematic view showing an example of a micro-gravure coating apparatus and an example of the method of forming a porous structure using the same, which are different from those shown in FIG. 3. As can be seen, the coating apparatus shown in FIG. 6 is the same as the apparatus shown in FIG. 3 except that the apparatus shown in FIG. 6 includes a strength increasing zone (aging zone) 230 where (4) the strength increasing step (aging step) is carried out right next to the chemical treatment zone 220 where (3) the chemical treatment step is carried out. That is, after (3) the chemical treatment step, (4) the strength increasing step (aging step) is carried out in the strength increasing zone (aging zone) 230 to increase the peel strength of the silicone porous body 20 relative to a resin film 10, thereby forming a silicone porous body 21 having a higher peel strength. For example, (4) the strength increasing step (aging step) may be carried out by heating the silicone porous body 20 in the same manner as described above using hot air fans (heating units) 231 disposed above and below the base 10. The conditions including the heating temperature, the time, and the like are not limited to particular values, and can be, for example, as described above. After (4) the strength increasing step, similar to the process shown in FIG. 3, a laminated film in which the silicone porous body 21 is formed on the base 10 is wound by a winding roller 251.

Figure 7:
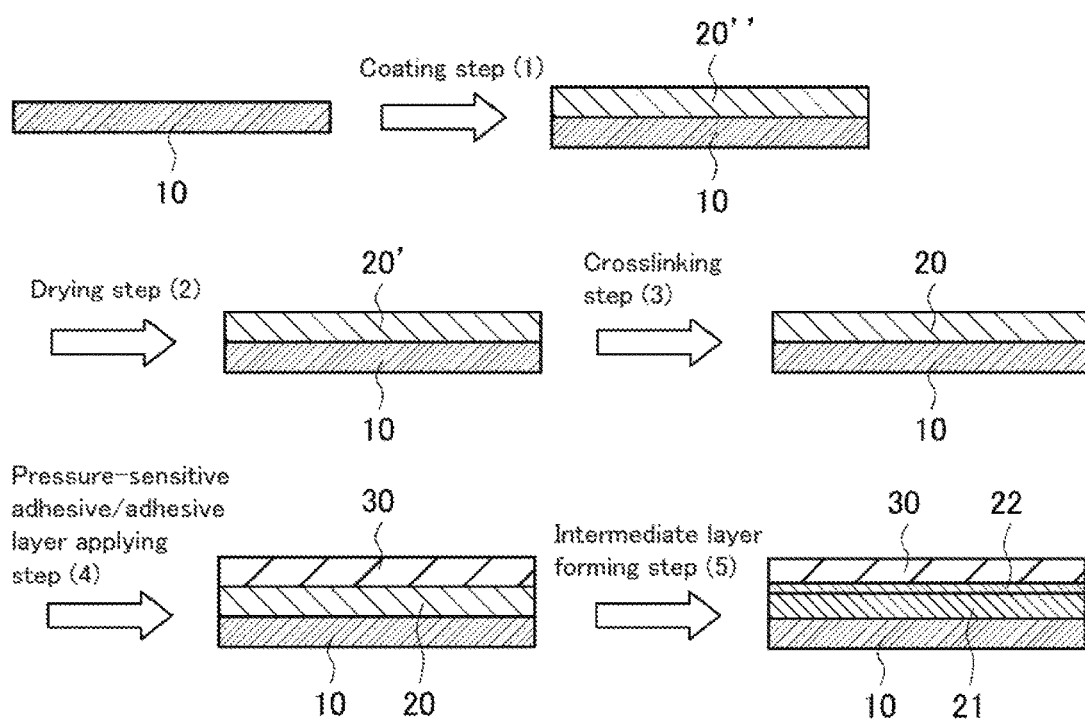
FIG. 7 is a process cross sectional view schematically showing still another example of the method of forming a silicone porous body on a base in the present invention.
Figure 8:
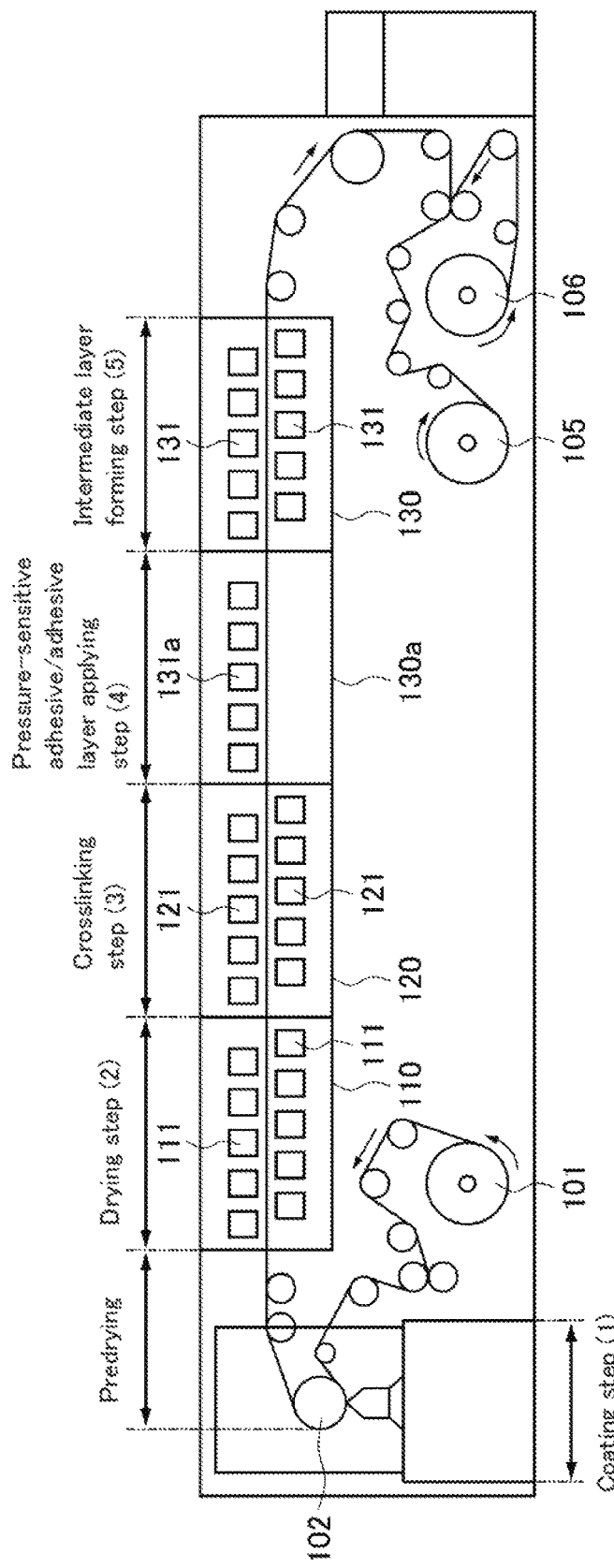
FIG. 8 is an illustration schematically showing still another example of a part of the process of producing a silicone porous body by using a coating material of the present invention and still another example of the apparatus used therefor.
Figure 9:
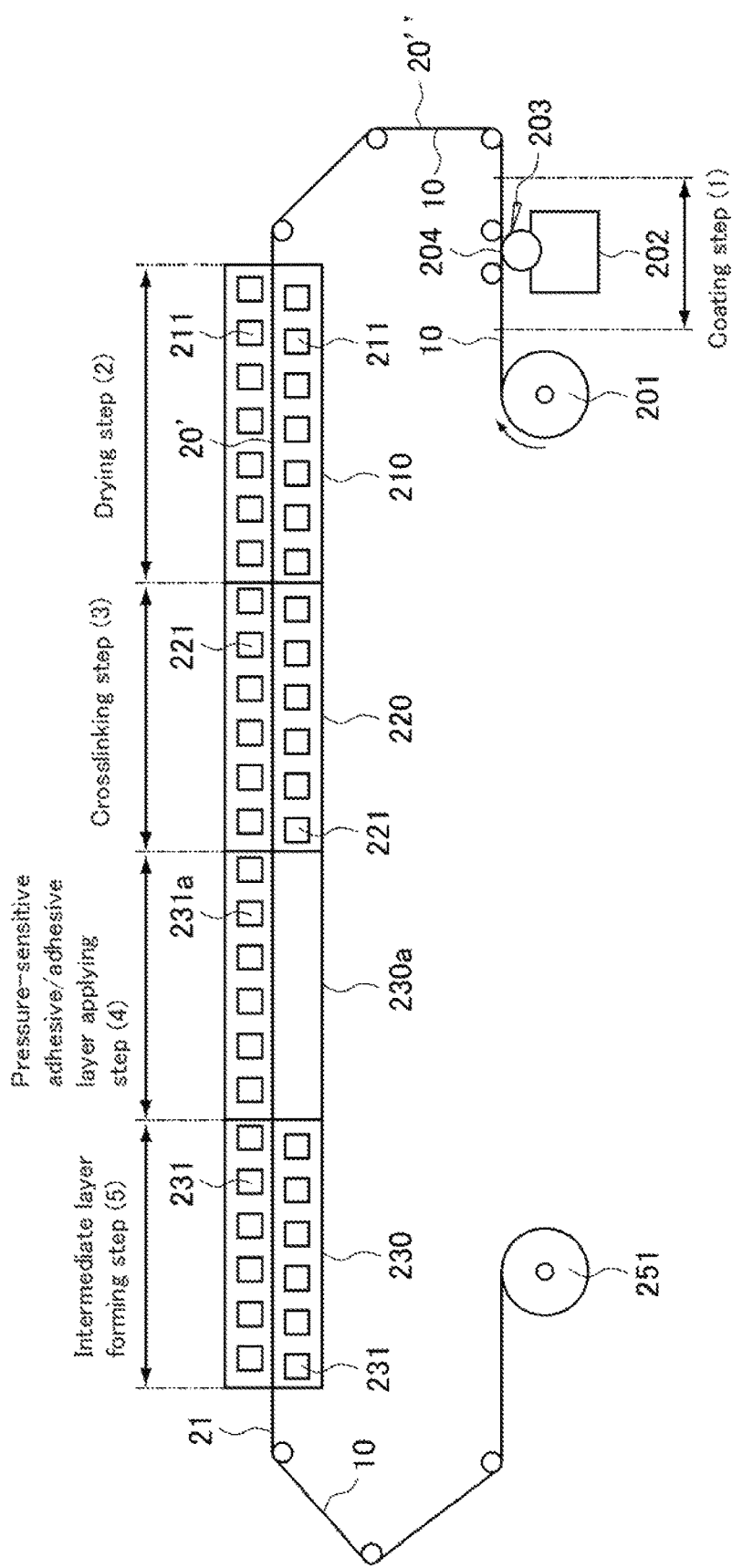
FIG. 9 is an illustration schematically showing still another example of a part of the process of producing a silicone porous body by using a coating material of the present invention and still another example of the apparatus used therefor.

FIGS. 7 to 9 show another example of a continuous treatment process of forming a silicone porous body of the present invention. As shown in the cross sectional view of FIG. 7, this method includes, after (3) the chemical treatment step (for example, crosslinking treatment step) of forming a silicone porous body 20, (4) a pressure-sensitive adhesive/adhesive layer applying step (pressure-sensitive adhesive/adhesive layer forming step) of coating the silicone porous body 20 with a pressure-sensitive adhesive/adhesive layer 30 and (5) an intermediate layer forming step of causing the silicone porous body 20 to react with the pressure-sensitive adhesive/adhesive layer 30 to form an intermediate layer 22. Except for these, the method shown in FIGS. 7 to 9 is the same as the method shown in FIGS. 4 to 6. In, FIG. 7, (5) the intermediate layer forming step also serves as a step of increasing the strength of the silicone porous body 20 (strength increasing step) so that the silicone porous body 20 changes to a silicone porous body 21 having a higher strength after (5) the intermediate layer forming step. The present invention, however, is not limited thereto, and the silicone porous body 20 may not change after (5) the intermediate layer forming step, for example. (4) The pressure-sensitive adhesive/adhesive layer applying step (pressure-sensitive adhesive/adhesive layer forming step) and (5) the intermediate layer forming step are not particularly limited, and can be, for example, as described above.

FIG. 8 is a schematic view showing another example of a slot die coating apparatus and another example of the method of forming a silicone porous body using the same. As can be seen, the coating apparatus shown in FIG. 8 is the same as the apparatus shown in FIG. 5 except that the apparatus shown in FIG. 8 includes a pressure-sensitive adhesive/adhesive layer applying zone 130a where (4) the pressure-sensitive adhesive/adhesive layer applying step is carried out right next to the chemical treatment zone 120 where (3) the chemical treatment step is carried out. In FIG. 8, the same heat treatment as that carried out in the strength increasing zone (aging zone) 130 of FIG. 5 can be carried out in an intermediate layer forming zone (aging zone) 130 disposed right next to the pressure-sensitive adhesive/adhesive layer applying zone 130a using hot air fans (heating units) 131 disposed above and below the base 10. That is, the apparatus shown in FIG. 8 carries out, after (3) the chemical treatment step, (4) the pressure-sensitive adhesive/adhesive layer applying step (pressure-sensitive adhesive/adhesive layer forming step) of applying a pressure-sensitive adhesive or an adhesive to the silicone porous body 20 to form a pressure-sensitive adhesive/adhesive layer 30 in the pressure-sensitive adhesive/adhesive layer applying zone 130a using pressure-sensitive adhesive/adhesive layer applying units 131a. Instead of applying the pressure-sensitive adhesive or the adhesive, for example, an adhesive tape including the pressure-sensitive adhesive/adhesive layer 30 may be adhered (taped) as described above. Thereafter, (5) the intermediate layer forming step (aging step) is carried out in the intermediate layer forming zone (aging zone) 130 to cause the silicone porous body 20 to react with the pressure-sensitive adhesive/adhesive layer 30, thereby forming an intermediate layer 22. In this step, the silicone porous body 20 changes to a silicone porous body 21 having a higher strength as described above. The conditions of the hot air fans (heating units) 131 including the heating temperature, the time, and the like are not limited to particular values, and can be, for example, as described above.

FIG. 9 is a schematic view showing another example of a micro-gravure coating apparatus and another example of the method of forming a porous structure using the same. As can be seen, the coating apparatus shown in FIG. 9 is the same as the apparatus shown in FIG. 6 except that the apparatus shown in FIG. 9 includes a pressure-sensitive adhesive/adhesive layer applying zone 230a where (4) the pressure-sensitive adhesive/adhesive layer applying step is carried out right next to the chemical treatment zone 220 where (3) the chemical treatment step is carried out. In FIG. 9, the same heat treatment as that carried out in the strength increasing zone (aging zone) 230 of FIG. 6 can be carried out in an intermediate layer forming zone (aging zone) 230 disposed right next to the pressure-sensitive adhesive/adhesive layer applying zone 230a using hot air fans (heating units) 231 disposed above and below the base 10. That is, the apparatus shown in FIG. 9 carries out, after (3) the chemical treatment step, (4) the pressure-sensitive adhesive/adhesive layer applying step (pressure-sensitive adhesive/adhesive layer forming step) of applying a pressure-sensitive adhesive or an adhesive to the silicone porous body 20 to form a pressure-sensitive adhesive/adhesive layer 30 in the pressure-sensitive adhesive/adhesive layer applying zone 230a using pressure-sensitive adhesive/adhesive layer applying units 231a. Instead of applying the pressure-sensitive adhesive or the adhesive, for example, an adhesive tape including the pressure-sensitive adhesive/adhesive layer 30 may be adhered (taped) as described above. Thereafter, (5) the intermediate layer forming step (aging step) is carried out in the intermediate layer forming zone (aging zone) 230 to cause the silicone porous body 20 to react with the pressure-sensitive adhesive/adhesive layer 30, thereby forming an intermediate layer 22. In this step, the silicone porous body 20 changes to a silicone porous body 21 having a higher strength as described above. The conditions of the hot air fans (heating units) 231 including the heating temperature, the time, and the like are not limited to particular values, and can be, for example, as described above.

[3. Silicone Porous Body]

As described below, the silicone porous body of the present invention is characterized in that, for example, the abrasion resistance showing a film strength, measured with BEMCOT® is in the range from 60% to 100% and the folding endurance showing flexibility, measured by the MIT test is 100 times or more. The present invention, however, is not limited thereto.

Since the silicone porous body of the present invention uses the pulverized products of the gelled silicon compound, the three-dimensional structure of the gelled silicon compound has been destroyed, and a new three-dimensional structure that is different from that of the gelled silicon compound is formed. Since the silicone porous body of the present invention is a layer having a new pore structure (new void-provided structure), which cannot be obtained from the layer formed by using the gelled silicon compound, a nanoscale silicone porous body with high proportion of void space can be formed. In the silicone porous body of the present invention, for example, the pulverized products are chemically bonded while adjusting the number of siloxane bond functional groups of the gelled silicon compound. Moreover, since the pulverized products are chemically bonded (for example, crosslinked) in the bonding step after a new three-dimensional structure has formed as the precursor of the silicone porous body, the silicone porous body of the present invention, despite its structure with void spaces, can maintain a sufficient strength and sufficient flexibility. Thus, according to the present invention, the silicone porous body can be applied to various objects in a simple and easy manner. Specifically, the silicone porous body of the present invention can be applied, as a substitute for an air layer, to a heat insulating material, a sound absorbing material, a regenerative medical scaffolding, a dew condensation preventing material, an optical element, and the like, for example.

As described above, the silicone porous body of the present invention includes pulverized products of a gelled silicon compound, wherein the pulverized products are chemically bonded, for example. In the silicone porous body of the present invention, the pattern of the chemical bond among the pulverized products is not limited to particular patterns. Specifically, the chemical bond can be, for example, a crosslinking bond. The method of chemically bonding the pulverized products is as described in detail in the description as to the production method of the silicone porous body.

The crosslinking bond is, for example, a siloxane bond. Examples of the siloxane bond include T2 bond, T3 bond, and T4 bond shown below. In the case where the silicone porous body of the present invention has the siloxane bond, the porous body of the present invention may have one of, two of or all of the above-mentioned three bond patterns, for example. The silicone porous body having higher proportions of T2 and T3 is superior in flexibility and can be expected to have an original property of a gel but is inferior in film strength. On the other hand, the silicone porous body having a higher proportion of T4 is superior in film strength but has small sized void spaces and is inferior in flexibility. Thus, it is preferable to change the proportions of T2, T3, and T4 depending on applications, for example.

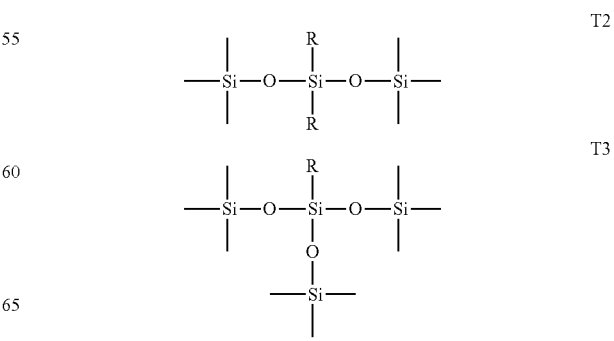

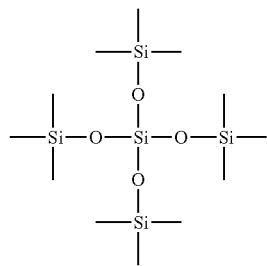

In the case where the silicone porous body of the present invention has the siloxane bond, the relative ratio among T2, T3, and T4 with T2 being considered as "1" is, for example, as follows:

T2:T3:T4=1:[1 to 100]:[0 to 50], 1:[1 to 80]:[1 to 40], or 1:[5 to 60]:[1 to 30].

The silicon atoms contained in the silicone porous body of the present invention are preferably bonded by a siloxane bond, for example. As a specific example, the proportion of the unbonded silicon atoms (i.e., residual silanol) among all the silicon atoms contained in the silicone porous body is, for example, less than 50%, 30% or less, or 15% or less.

The silicone porous body has a pore structure. The size of a void space (pore) in the present invention indicates not the diameter of the short axis but the diameter of the long axis of the void space. The size of a void space (pore) is preferably in the range from 5 nm to 200 nm, for example. The lower limit of the size of a void space is, for example, 5 nm or more, 10 nm or more, or 20 nm or more, the upper limit of the size of a void space is, for example, 1000 μm or less, 500 μm or less, or 100 μm or less, and the size of a void space is, for example, in the range from 5 nm to 1000 μm, 10 nm to 500 μm, or 20 nm to 100 μm. A preferable size of a void space changes depending on applications of the void-provided structure. Thus, the size of a void space should be adjusted to a desired size according to purposes, for example. The size of a void space can be evaluated by the method described below.

(Evaluation of Size of Void Space)

In the present invention, the size of a void space can be quantified according to the BET test. Specifically, 0.1 g of a sample (the silicone porous body of the present invention) is set in the capillary of a surface area measurement apparatus (product of Micromeritics, product name: ASAP 2020), and dried under a reduced pressure at room temperature for 24 hours to remove gas in the void-provided structure. Then, an adsorption isotherm is created by adsorbing a nitrogen gas to the sample, thereby obtaining a pore distribution. The size of a void space can thereby be evaluated.

The abrasion resistance of the silicone porous body of the present invention showing a film strength, measured with BEMCOT® is, for example, in the range from 60% to 100%. The abrasion resistance means, for example, a strength such as a film strength. The present invention having such a film strength has a superior abrasion resistance in various processes, for example. The present invention has a scratch resistance during a production process including winding a formed silicone porous body and handling a product film, for example. Furthermore, in the silicone porous body of the present invention, by utilizing the catalysis in the heating step described below instead of reducing the proportion of void space, for example, the particle size of the pulverized product of a gelled silicon compound and the bonding force of the neck at which the pulverized products are bonded can be increased. Thereby, the silicone porous body of the present invention can impart a certain level of strength to a void-provided structure which is intrinsically fragile, for example.

The lower limit of the abrasion resistance is, for example, 60% or more, 80% or more, or 90% or more, the upper limit thereof is, for example, 100% or less, 99% or less, or 98% or less, and the abrasion resistance is, for example, in the range from 60% to 100%, 80% to 99%, or 90% to 98%.

The abrasion resistance can be measured, for example, according to the method described below.

(Evaluation of Abrasion Resistance)

(1) A void-provided layer (the silicone porous body of the present invention) formed on an acrylic film by coating is cut into a circle having a diameter of about 15 mm as a sample.

(2) Next, as to the sample, the coating amount of Si ($Si_0$) is measured by identifying silicon by X-ray fluorescence (product of Shimadzu Corporation, product name: ZSX Primus ID. Subsequently, the void-provided layer on the acrylic film in proximity to the site where the circular sample was obtained is cut so as to have a piece having a size of 50 mm×100 mm, the obtained piece is fixed to a glass plate (thickness: 3 mm), and a sliding test is performed using BEMCOT®. The sliding condition is as follows: weight: 100 g, reciprocation: 10 times.

(3) The sampling and X-ray fluorescence measurement of the void-provided layer after finishing sliding are performed in the same manner as the above described item (1) to measure the residual amount of Si ($Si_1$) after an abrasion test. The abrasion resistance is defined by the residual ratio of Si (%) before and after the sliding test using BEMCOT®, and is represented by the following formula.

$$\text{abrasion resistance (\%)} = [\text{residual amount of Si}(Si_1)/Si \text{ coating amount } (Si_0)] \times 100(\%)$$

The folding endurance of the silicone porous body of the present invention measured by the MIT test is, for example, 100 times or more. The folding endurance shows flexibility, for example. Since the present invention has such flexibility, for example, a superior winding ability in production and a superior handleability in use can be achieved, for example.

The lower limit of the folding endurance is, for example, 100 times or more, 500 times or more, or 1000 times or more, the upper limit of the folding endurance is not limited to particular values and is, for example, 10000 times or less, and the folding endurance is, for example, in the range from 100 to 10000 times, 500 to 10000 times, or 1000 to 10000 times.

The flexibility means deformability of a substance, for example. The folding endurance by the MIT test can be measured, for example, by the method described below.

(Evaluation of Folding Endurance Test)

The void-provided layer (the silicone porous body of the present invention) is cut into a piece having a size of 20 mm×80 mm, then the obtained piece is attached to a MIT folding endurance tester (production of TESTER SANGYO CO., LTD., product name: BE-202), and 1.0 N load is applied thereto. A chuck of R 2.0 mm for holding the void-provided layer is used, application of load is at most 10000 times, and the number of times of application of load at the time of fracture of the void-provided layer is assumed as the folding endurance.

The film density of the silicone porous body of the present invention showing a proportion of void space is not limited to particular values, and the lower limit thereof is, for example, 1 g/cm³ or more, 10 g/cm³ or more, 15 g/cm³ or more, the upper limit thereof is, for example, 50 g/cm³ or less, 40 g/cm³ or less, or 30 g/cm³ or less, or 2.1 g/cm³ or less, and the film density is, for example, in the range from 5 to 50 g/cm³, 10 to 40 g/cm³, 15 to 30 g/cm, or 1 to 2.1 g/cm³.

The film density can be measured, for example, according to the method described below.

(Evaluation of Film Density)

After forming a void-provided layer (silicone porous body of the present invention) on an acrylic film, the X-ray reflectivity in the total reflection region is measured using an X-ray diffractometer (product of RIGAKU, product name: RINT-2000). Then, after fitting with Intensity at 20, the porosity (P %) is calculated from the total reflection angle of the laminate (void-provided layer and base). The film density is calculated by the following formula.

film density (%)=100(%)−porosity (P%)

It is only required that the silicone porous body of the present invention has a pore structure (porous structure) as described above, and the silicone porous body may have an open-cell structure in which the pore structures are interconnected, for example. The open-cell structure means, for example, that the pore structures are three-dimensionally interconnected in the silicone porous body of the present invention, i.e., void spaces in the pore structures are interconnected. When a porous body has an open-cell structure, the proportion of void space of the bulk body can be increased. However, an open-cell structure cannot be formed with closed-cell particles such as hollow silica. In this regard, since the silica sol particles (pulverized products of a gelled silicon compound which forms sol) have a three-dimensional dendritic structure, the silicone porous body of the present invention can form an open-cell structure easily by settlement and deposition of the dendritic particles in a coating film (sol coating film containing the pulverized products of the gelled silicon compound). The silicone porous body of the present invention preferably forms a monolith structure in which the open-cell structure has multiple pore distributions. The monolith structure denotes a hierarchical structure including a structure in which nano-sized void spaces are present and an open-cell structure in which the nano-sized spaces are aggregated, for example. The monolith structure can impart a film strength with minute void spaces while imparting a high proportion of void space with coarse open-cell structure, which achieve both a film strength and a high proportion of void space, for example. For forming such a monolith structure, for example, it is important to control the pore distribution of a void-provided structure to be created in a gelled silicon compound before pulverizing into the pulverized products. For example, by controlling the particle size distribution of the pulverized product to a desired size in pulverization of the gelled silicon compound, the monolith structure can be formed.

In the silicone porous body of the present invention, the elongation rate at which cracks are caused is not limited to particular values. The elongation rate shows flexibility. The lower limit of the elongation rate is, for example, 0.1% or more, 0.5% or more, or 1% or more, the upper limit thereof is, for example, 3% or less, and the elongation rate is, for example, in the range from 0.1 to 3%, 0.5 to 3%, or 1 to 3%.

The elongation rate can be measured, for example, according to the method described below.

(Evaluation of Elongation Rate)

After forming a void-provided layer (the silicone porous body of the present invention) on an acrylic film, a piece having a size of 5 mm×140 mm is obtained as a sample. Then, the sample is chucked in a tensile testing machine (product of Shimadzu Corporation, product name: AG-Xplus) with a chuck space of 100 mm, and the tensile test is performed at the tensile speed of 0.1 mm/sec. The sample is carefully observed during the test and the test is ended at the time when a crack is caused at a part of the sample. The rate (%) at the time when the crack is caused is assumed as the elongation rate.

In the silicone porous body of the present invention, the haze showing transparency is not limited to particular values, and the lower limit thereof is, for example, 0.1% or more, 0.2% or more, or 0.3% or more, the upper limit thereof is, for example, 10% or less, 5% or less, or 3% or less, and the haze is, for example, in the range from 0.1 to 10%, 0.2 to 5%, or 0.3 to 3%.

The haze can be measured, for example, by the method described below.

(Evaluation of Haze)

A void-provided layer (silicone porous body of the present invention) is cut into a piece having a size of 50 mm×50 mm, and the obtained piece is set to a hazemeter (product of Murakami Color Research Laboratory, product name: HM-150) to measure a haze. The haze value is calculated by the following formula.

haze (%)=[diffuse transmittance (%)/total light transmittance (%)]×100(%)

Commonly, a ratio between the transmission speed of the wavefront of light in vacuum and the phase velocity of light in a medium is called a refractive index of the medium. The upper limit of the refractive index of the silicone porous body of the present invention is, for example, 1.3 or less, less than 1.3, 1.25 or less, 1.2 or less, or 1.15 or less, the lower limit thereof is, for example, 1.05 or more, 1.06 or more, or 1.07 or more, and the refractive index is, for example, 1.05 or more and 1.3 or less, 1.05 or more and less than 1.3, 1.05 or more and 1.25 or less, 1.06 or more and less than 1.2, or 1.07 or more and 1.15 or less.

In the present invention, the refractive index is a refractive index measured at the wavelength of 550 nm unless otherwise stated. The method of measuring a refractive index is not limited to particular methods, and the refractive index can be measured, for example, by the method described below.

(Evaluation of Refractive Index)

After forming a void-provided layer (silicone porous body of the present invention) on an acrylic film, the obtained laminate is cut into a piece having a size of 50 mm×50 mm, and the obtained piece is adhered to the front surface of a glass plate (thickness: 3 mm) through a pressure-sensitive adhesive/adhesive layer. The center of the back surface of the glass plate (diameter: about 20 mm) is solidly painted with a black magic marker, thereby preparing a sample which allows no reflection at the back surface of the glass plate. The sample is set to an ellipsometer (product of J. A. Woollam Japan, product name: VASE), the refractive index is measured at the wavelength of 500 nm and at the incidence angle of 50° to 80°, and the average value is assumed as a refractive index.

The thickness of the silicone porous body of the present invention is not limited to particular values, and the lower limit thereof is, for example, 0.05 µm or more or 0.1 µm or more, the upper limit thereof is, for example, 1000 µm or less or 100 μm or less, and the thickness is, for example, in the range from 0.05 to 1000 μm or 0.1 to 100 μm.

The form of the silicone porous body of the present invention is not limited to particular forms, and may be a film shape, a block shape or the like, for example.

The method of producing a silicone porous body of the present invention is not limited to particular methods, and can be produced according to the above-described production method of the silicone porous body, for example. [4. Application of Silicone Porous Body]

Since the silicone porous body produced by using the coating material of the present invention has a function equivalent to that of an air layer as described above, it can be applied to an object including the air layer in place of the air layer.

Examples of the member including the silicone porous body include heat insulating materials, sound absorbing materials, dew condensation preventing materials, and optical elements. These members can be used by disposing them at a place where an air layer is needed, for example. The form of these members is not limited to particular forms, and can be, for example, a film.

The member including the silicone porous body can be, for example, a regenerative medical scaffolding. The silicone porous body has a porous structure which has a function equivalent to that of an air layer as described above. Since the void spaces of the silicone porous body of the present invention are optimal to hold cells, nutrient sources, air, and the like, for example, the porous structure is useful as a regenerative medical scaffolding, for example.

Examples of the member including the silicone porous body include, besides these, total reflection members, ink image receiving materials, antireflection monolayers, moth eye monolayers, and permittivity materials.

EXAMPLES

The examples of the present invention are described below. The present invention, however, is not limited by the following examples.

Example 1

In the present example, a coating material and a porous structure (silicone porous body) of the present invention were produced as described below.

(1) Gelation of Silicon Compound 0.95 g of MTMS which is the precursor of a silicon compound was dissolved in 2.2 g of DMISO. 0.5 g of 0.01 mol/L oxalic acid aqueous solution was added to the mixture, and the resultant was stirred at room temperature for 30 minutes to hydrolyze MTMS, thereby preparing tris(hydroxy)methylsilane.

0.38 g of ammonia water having a concentration of 28% and 0.2 g of pure water were added to 5.5 g of DMBO, then the aforementioned mixture that had been subjected to the hydrolysis treatment was added thereto, and the resultant was stirred at room temperature for 15 minutes to cause gelation of tris(hydroxy)methylsilane, thereby obtaining a gelled silicon compound.

(2) Aging Treatment

The aging treatment was carried out as follows. The mixture that had been subjected to the gelation treatment was incubated at 40° C. for 20 hours.

(3) Pulverizing Treatment

Subsequently, the gelled silicon compound that had been subjected to the aging treatment was granulated into pieces of several millimeters to several centimeters using a spatula. 40 g of IPA was added thereto, the mixture was stirred lightly and then was allowed to stand still at room temperature for 6 hours, and a solvent and a catalyst in the gel were decanted. This decantation treatment was repeated three times, and the solvent replacement was completed. Then, the gelled silicon compound in the mixture was subjected to high pressure medialess pulverization. This pulverizing treatment was carried out using a homogenizer (product of SMT Corporation, product name: UH-50) as follows. That is, 1.18 g of gel and 1.14 g of IPA were added to 5 cc screw bottle and pulverized for 2 minutes at 50 W and 20 kHz.

The gelled silicon compound in the mixture was pulverized by the pulverizing treatment, whereby the mixture was changed to a sol liquid of the pulverized product. The volume average particle size showing particle size variations of the pulverized products contained in the mixture (coating material) measured by a dynamic light scattering nanotrac particle size analyzer (product of NIKKISO CO., LTD., product name: UPA-EX150) was 0.50 to 0.70. 0.02 g of 0.3 wt % KOH aqueous solution, which is a catalyst, was added to 0.5 g of the sol liquid, thereby preparing a coating liquid (coating material containing catalyst).

(4) Formation of Coating Film and Silicone Porous Body

The coating liquid was applied to the surface of a base made of polyethylene terephthalate (PET) by bar coating, thereby forming a coating film. 6 μL of the sol liquid was applied to per square millimeter of the surface of the base. By treating the coating film at 100° C. for one minute, the precursor of the silicone porous body was formed and the crosslinking reaction among the pulverized products in the precursor was completed. Thereby, a silicone porous body having a thickness of 1 μm in which the pulverized products are chemically bonded was formed on the base.

Example 2

A silicone porous body was formed on a base in the same manner as in Example 1 except that 0.031 of isopropyl alcohol (IPA) solution containing 1.5 wt % photobase generation catalyst (product of Wako Pure Chemical Industries, Ltd., product name: WPBG 266) instead of KOH aqueous solution was added to 0.75 g of the sol particle liquid to prepare a coating liquid and the formed film was irradiated with UV with the light amount of 350 mJ/cm$^2$ (in terms of the wave length at 360 nm). After UV irradiation, thermal aging at 60° C. was carried out for 20 hours, thereby further increasing the film strength of the porous body.

Example 3

A silicone porous body was formed in the same manner as in Example 2 except that 0.018 g of 5 wt % bis(trimethoxysilyl) ethane was further added to 0.75 g of the sol liquid in the coating liquid described in Example 2.

Comparative Example 1

A porous body was formed in the same manner as in Example 1 except that the conditions for the incubation in the aging step were changed to at 40° C. for 72 hours.

Comparative Example 2

A porous body was formed in the same manner as in Example 1 except that tetramethoxysilane (TEOS) was used as the precursor of a silicon compound and the conditions for the incubation in the aging step were changed to at 40° C. for 72 hours. In Comparative Example 2, since cracks were partially caused in the film when the porous body (film) having a thickness of 1 μm was produced, the porous body (film) having a thickness of 200 nm was produced.

The refractive index, the proportion of a residual silanol, and the abrasion resistance of each of the porous bodies obtained in Example 1 and Comparative Examples 1 and 2 were measured. The results are summarized in the following Table 1.

TABLE 1

| Item | Ex. 1 | Comparative Ex. 1 | Comparative Ex. 2 |
|---|---|---|---|
| Refractive index | 1.11 | 1.12 | 1.16 |
| Residual silanol | 9% | 0.7% | |
| Abrasion resistance | 80% | 10% | 93% |

As summarized in Table 1, the silicone porous body (void-provided layer) having a thickness of 1 μm formed by using the sol liquid obtained in Example 1 had a refractive index of less than 1.2 and achieved a film strength easily. Similarly, each of the silicone porous bodies (void-provided layers) formed by using the sol liquids obtained in Examples 2 and 3 achieved a low refractive index and a high film strength, although the results are not summarized in Table 1. On the other hand, in the case of using the sol liquid of Comparative Example 1, a silanol group was hardly remained in a gel due to an aging for a long time. Thus, the crosslinking structure was not formed in the bonding step and could not achieve a sufficient film strength. The sol liquid of Comparative Example 2, in which TEOS was used as the precursor of the silicon compound, achieved a high film strength but showed significant decrease in flexibility. This shows that it is very effective to adjust the precursor of a silicon compound and a residual silanol group for achieving both a film strength and flexibility.

Example 4

In the present example, a coating material and a porous structure (silicone porous body) of the present invention were produced as described below.

The "(1) gelation of silicon compound" and the "(2) aging treatment" were carried out in the same manner as in Example 1. Subsequently, the "(3) pulverizing treatment" was carried out in the same manner as in Example 1 except that an isopropyl alcohol (IPA) solution containing 1.5 wt % photobase generation catalyst (product of Wako Pure Chemical Industries, Ltd., product name: WPBG 266) instead of 0.3 wt % KOH aqueous solution was added to the sol particle liquid, thereby preparing a coating liquid (a coating material containing catalyst). The amount of the IPA solution containing the photobase generation catalyst to be added relative to 0.75 g of the sol particle liquid was 0.031 g. Then, the "(4) formation of coating film and silicone porous body" was carried out in the same manner as in Example 1. The porous body obtained in this manner after drying was irradiated with UV. The condition for the UV irradiation was as follows. That is, the wavelength of the light was 360 nm and the amount of the light irradiation (energy) was 500 mJ. After UV irradiation, thermal aging at 60° C. was carried out for 22 hours, thereby forming a porous structure of the present example.

Example 5

A coating material and a porous structure (silicone porous body) were formed in the same manner as in Example 4 except that thermal aging was not carried out after UV irradiation Example 6

A coating material and a porous structure (silicone porous body) were formed in the same manner as in Example 4 except that, after the IPA solution containing the photobase generation catalyst had been added, 0.018 g of 5 wt % bis(trimethoxy)silane was added to 0.75 g of the sol liquid to adjust a coating liquid.

Example 7

A coating material and a porous structure (silicone porous body) were formed in the same manner as in Example 4 except that the amount of the IPA solution containing the photobase generation catalyst to be added relative to 0.75 g of sol liquid was 0.054 g.

Example 8

After subjecting the porous body after drying to the UV irradiation in the same manner as in Example 4 and before subjecting the porous body to thermal aging, the pressure-sensitive adhesive side of a PET film, to one side of which a pressure-sensitive adhesive (pressure-sensitive adhesive/adhesive layer) is applied, was adhered to the porous body at room temperature, and then the porous body was subjected to thermal aging at 60° C. for 22 hours. Except for this, a coating material and a porous structure (silicone porous body) were formed in the same manner as in Example 4.

Example 9

A coating material and a porous structure (silicone porous body) were formed in the same manner as in Example 8 except that thermal aging was not carried out after adhering the PET film.

Example 10

A coating material and a porous structure (silicone porous body) were formed in the same manner as in Example 8 except that, after the IPA solution containing the photobase generation catalyst had been added, 0.018 g of 5 wt % bis(trimethoxy)silane was added to 0.75 g of the sol liquid to adjust a coating liquid (coating material containing catalyst).

Example 11

A coating material and a porous structure (silicone porous body) were formed in the same manner as in Example 8 except that the amount of the IPA solution containing the photobase generation catalyst to be added relative to 0.75 g of the sol liquid was 0.054 g.

The refractive index, the peel strength, and the haze of each of the porous structures obtained in Examples 4 to 11 were measured according to the above-described method. The results are summarized in Tables 2 and 3. In measurement of the peel strength of each of the silicone porous bodies obtained in Examples 6 to 9, since a PET film and a pressure-sensitive adhesive layer had already adhered to the laminated film roll, application of the PET film and the acrylic pressure-sensitive adhesive to the laminated film roll was omitted. The storage stability of each of the coating liquids (coating material containing catalys) are summarized in Tables 2 and 3. The storage stability shows a result obtained by visually observing the coating liquid after one week storage at room temperature to check the change of the coating liquid before and after the storage.

TABLE 2

|  | Example 4 | Example 5 | Example 6 | Example 7 |
|---|---|---|---|---|
| Refractive index | 1.14 | 1.15 | 1.15 | 1.16 |
| Peel strength | 2 N/25 mm | 1.2 N/25 mm | 3 N/25 mm | 2 N/25 mm |
| Storage stability | No change after 1 week | No change after 1 week | No change after 1 week | No change after 1 week |
| Haze | 0.4 | 0.4 | 0.4 | 0.4 |
| Abrasion resistance | 70% | 70% | 75% | 78% |

TABLE 3

|  | Example 8 | Example 9 | Example 10 | Example 11 |
|---|---|---|---|---|
| Refractive index | 1.14 | 1.15 | 1.15 | 1.16 |
| Peel strength | 2 N/25 mm | 1.2 N/25 mm | 3 N/25 mm | 2 N/25 mm |
| Storage stability | No change after 1 week | No change after 1 week | No change after 1 week | No change after 1 week |
| Haze | 0.4 | 0.4 | 0.4 | 0.4 |
| Abrasion resistance | 70% | 75% | 75% | 78% |

As summarized in Tables 2 and 3, each of the silicone porous bodies having a thickness of 1 μm obtained in Examples 4 to 11 has a very low refractive index in the range from 1.14 to 1.16. Furthermore, these ultra-low refractive index layers each show a very low haze value of 0.4, which shows very high transparency. Furthermore, since each of the ultra-low refractive index layers obtained in Examples 4 to 11 has a high peel strength, even after forming a roll by winding the ultra-low refractive index layer, the layer is less likely to be peeled from another layer of the laminated film roll. Moreover, each of the silicone porous bodies obtained in Examples 4 to 11 is also superior in an abrasion resistance. Each of the coating liquids (coating material containing catalyst) of Examples 4 to 11 was visually observed after one week storage, and no change was observed. This shows that a silicone porous body that is superior in storage stability and achieves stable quality can be produced efficiently.

INDUSTRIAL APPLICABILITY

As described above, since the coating material obtained according to the production method of the present invention contains the pulverized products of the gelled silicon compound and the pulverized product contains a residual silanol group, for example, a porous structure with void spaces can be produced by forming a coating film using the coating material and chemically bonding the pulverized products in the coating film. Thus, the porous structure formed by using the coating material has a function equivalent to that of the air layer, for example. Furthermore, since the porous structure is immobilized by chemically bonding the pulverized products as described above, the obtained porous structure, despite its structure with void spaces, can maintain a sufficient strength. Thus, such a porous structure allows the silanol porous body to be applied to various objects in a simple and easy manner. Specifically, the porous structure of the present invention can be applied, as a substitute for an air layer, to a heat insulating material, a sound absorbing material, a regenerative medical scaffolding, a dew condensation preventing material, an optical element, and the like, for example. Accordingly, the production method of the present invention and the coating material obtained according to the production method are useful in the production of the porous structure having the above described properties, for example.

EXPLANATION OF REFERENCE NUMERALS

10 base
20 porous structure
20' coating film (precursor layer)
20" coating material
21 porous structure with improved strength
101 delivery roller
102 coating roller
110 oven zone
111 hot air fan (heating unit)
120 chemical treatment zone
121 lamp (light irradiation unit) or hot air fan (heating unit)
130*a* pressure-sensitive adhesive/adhesive layer applying zone
130 intermediate forming zone
131*a* pressure-sensitive adhesive/adhesive layer applying unit
131 hot air fan (heating unit)
105 winding roller
106 roller
201 delivery roller
202 liquid reservoir
203 doctor (doctor knife)'
204 micro-gravure
210 oven zone
211 heating unit
220 chemical treatment zone
221 lamp (light irradiation unit) or hot air fan (heating unit)
230*a* pressure-sensitive adhesive/adhesive layer applying zone
230 intermediate forming zone
231*a* pressure-sensitive adhesive/adhesive layer applying unit
231 hot air fan (heating unit)
251 winding roller

The invention claimed is:
1. A silicone sol coating material comprising:
pulverized products of a gelled silicon compound obtained from a silicon compound containing three or less functional groups represented by chemical formula (2), where in the chemical formula (2),
x is 1, 2 or 3,
$R^1$ and $R^2$ each represent a linear or branched alkyl group,
$R^1$ and $R^2$ may be the same or different,
$R^1$ may be the same or different in the case where x is 1 or 2, and
$R^2$ may be the same or different where x is 2 or 3;

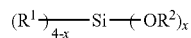

(2)

and
a dispersion medium, wherein
the pulverized product contains a residual silanol group at 1 mol % or more,
a volume average particle size of the pulverized product is in a range from 0.05 to 2.00 μm, and
the pulverized products are to be chemically bonded.

2. The coating material according to claim 1, wherein where in the chemical formula (2),
x is 2 or 3.

3. The coating material according to claim 1, comprising:
a catalyst for chemically bonding the pulverized products.

4. A method of producing the silicone sol coating material according to claim 1, comprising a step of:
mixing a dispersion medium and pulverized products of a gelled silicon compound obtained from a silicon compound containing three or less functional groups.

5. The method according to claim 4, further comprising a step of:
adding a crosslinking assisting agent for indirectly bonding the pulverized products of the gelled silicon compound in the mixing step.

6. The method according to claim 5, wherein
an amount of the crosslinking assisting agent to be added relative to a weight of the pulverized product of the gelled silicon compound is in a range from 0.01 wt % to 20 wt %.

7. The method according to claim 4, further comprising a step of:
pulverizing the gelled silicon compound in a solvent, wherein
the pulverized products obtained in the pulverizing step are used in the mixing step.

8. The method according to claim 7, further comprising a step of:
causing gelation of the silicon compound in a solvent to generate the gelled silicon compound, wherein the gelled silicon compound obtained in the gelation step is used in the pulverizing step.

9. The method according to claim 8, further comprising a step of:
aging the gelled silicon compound in a solvent, wherein
the gelled silicon compound after the aging step is used in the gelation step.

10. The method according to claim 9, wherein
the gelled silicon compound is incubated at 30° C. or more in the solvent in the aging step.

11. A silicone sol coating material comprising:
pulverized products of a gelled silicon compound obtained from a silicon compound containing three or less functional groups represented by chemical formula (2), where in the chemical formula (2),
x is 1, 2 or 3,
$R^1$ and $R^2$ each represent a linear or branched alkyl group,
$R^1$ and $R^2$ may be the same or different,
$R^1$ may be the same or different in the case where x is 1 or 2, and
$R^2$ may be the same or different in the case where x is 2 or 3,

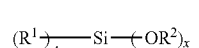

(2)

a crosslinking assisting agent for indirectly bonding the pulverized products, and
a dispersion medium, wherein
the pulverized product contains a residual silanol group at 1 mol % or more, and
the pulverized products are to be chemically bonded.

12. The coating material according to claim 11, wherein in the chemical formula (2), x is 2 or 3.

13. The coating material according to claim 11, comprising: a catalyst for chemically bonding the pulverized products.

14. The coating material according to claim 11, wherein
a content of the crosslinking assisting agent relative to a weight of the pulverized product is in a range from 0.01 wt % to 20 wt %.

15. A coating raw material for use in production of the silicone sol coating material according to claim 11, comprising:
a gelled silicon compound obtained from a silicon compound containing three or less functional groups.

16. A method of producing the coating raw material according to claim 15, comprising a step of:
causing gelation of a silicon compound containing three or less functional groups in a solvent to generate a gelled silicon compound.

* * * * *